United States Patent
Vargas et al.

(10) Patent No.: US 12,293,164 B2
(45) Date of Patent: May 6, 2025

(54) DEVICES AND TECHNIQUES TO PERFORM ENTROPY-BASED RANDOMNESS VIA A CONTACTLESS CARD

(71) Applicant: Capital One Services, LLC, McLean, VA (US)

(72) Inventors: Cruz Vargas, Alexandria, VA (US); Bryant Yee, Washington, DC (US); Sarah Olsen, Allen, TX (US)

(73) Assignee: Capital One Services, LLC, McLean, VA (US)

( * ) Notice: Subject to any disclaimer, the term of this patent is extended or adjusted under 35 U.S.C. 154(b) by 918 days.

(21) Appl. No.: 17/464,387

(22) Filed: Sep. 1, 2021

(65) Prior Publication Data
US 2023/0065643 A1   Mar. 2, 2023

(51) Int. Cl.
*G06F 7/58*    (2006.01)
*G06F 21/62*   (2013.01)
*H04L 9/08*    (2006.01)
*G06K 19/04*   (2006.01)
*G06K 19/07*   (2006.01)

(52) U.S. Cl.
CPC .......... *G06F 7/588* (2013.01); *G06F 21/6209* (2013.01); *H04L 9/0869* (2013.01); *G06K 19/045* (2013.01); *G06K 19/0723* (2013.01)

(58) Field of Classification Search
CPC ... G06F 7/588; G06F 21/6209; H04L 9/0869; G06K 19/045; G06K 19/0723
See application file for complete search history.

(56) References Cited

U.S. PATENT DOCUMENTS

| | | | |
|---|---|---|---|
| 8,761,809 B2 | 6/2014 | Faith et al. | |
| 10,733,283 B1 | 8/2020 | Osborn et al. | |
| 2006/0016871 A1* | 1/2006 | Bonalle | G06Q 20/40145 235/382 |
| 2011/0154056 A1* | 6/2011 | Spalka | G06F 21/6245 380/46 |
| 2012/0205451 A1* | 8/2012 | Poidomani | G06K 19/077 235/492 |
| 2018/0096340 A1* | 4/2018 | Omojola | G06Q 20/3221 |
| 2019/0228402 A1* | 7/2019 | Geraud | G06Q 20/3823 |
| 2020/0285929 A1* | 9/2020 | Rahman | G06K 19/0718 |
| 2020/0387765 A1* | 12/2020 | Meers | G06K 19/0716 |
| 2021/0019119 A1 | 1/2021 | Becker et al. | |
| 2021/0233072 A1* | 7/2021 | Walters | G06Q 20/02 |
| 2021/0409207 A1* | 12/2021 | Prokop | H04L 9/0825 |

FOREIGN PATENT DOCUMENTS

DE    102004047614 A1    4/2006

OTHER PUBLICATIONS

Ullah et al. "Entropy as a Service: A Lightweight Random No. Generator for Decentralized IoT Applications", 2020, pp. 1-6, 2020 IEEE International Conference on Pervasive Computing and Communications Workshops (PerCom Workshops) (Year: 2020).*
International Search Report and Written Opinion mailed Dec. 20, 2022, for Application No. PCT/US2022/042338 (13 pages).

* cited by examiner

Primary Examiner — Hee K Song
(74) Attorney, Agent, or Firm — KDW FIRM PLLC

(57) ABSTRACT

Embodiments are directed to systems and techniques to generate random numbers via contactless cards.

20 Claims, 17 Drawing Sheets

DEVICES AND TECHNIQUES TO PERFORM ENTROPY-BASED RANDOMNESS VIA A CONTACTLESS CARD

BACKGROUND

Many computers today are configured with algorithms to generate "random numbers." However, these algorithms are not true random number generators but are typical pseudo-random number generators (PRNG) configured for generating a sequence of numbers whose properties approximate the properties of sequences of random numbers. The PRNG-generated sequences are only good as an initial value, called the PRNG's seed. Thus, it's important to generate a random seed value. PRNGs are central in applications such as simulations, electronic games, and cryptography. It is particularly important in cryptographic applications to use numbers that are not predictable from earlier outputs.

BRIEF SUMMARY

Embodiments are generally directed to systems, devices, components, and so forth to perform techniques to generate random numbers via contactless cards. For example, embodiments include a contactless card including one or more sensors; processing circuitry coupled with the one or more sensors; and memory coupled with the processing circuitry and the one or more sensors. The memory may be configured to store instructions, that when executed by the processing circuitry, to cause the processing circuitry to receive data from at least one of the one or more sensors, generate a random sample of the data by randomly sampling a portion of the data, generate a random number with the random sample and a cryptographic algorithm, and generate a pair of keys with a key generation algorithm using the random number, the pair of keys comprising a private key and a public key.

Embodiments may also include the systems, devices, components, and so forth to perform methods including collecting, by processing circuitry of a contactless card, data from a plurality of sensors of the contactless card, randomly sampling, by the processing circuitry, the data from the plurality of sensors to generate a seed value, utilizing, by the processing circuitry, the seed value with a cryptographic algorithm to generate a random number, generating, by the processing circuitry, a pair of keys with a key generation algorithm using the seed value, the pair of keys comprising a private key and a public key, and storing, by the processing circuitry, the pair of keys in memory of the contactless card.

Embodiments may also include a contactless card, comprising one or more sensors; processing circuitry coupled with the one or more sensors; and memory coupled with the processing circuitry and the one or more sensors. The memory may be configured to store instructions, that when executed by the processing circuitry, to cause the processing circuitry to receive data from at least one of the one or more sensors, generate a random sample of the data by randomly sampling a portion of the data, receive a request for a random number from a device, apply a cryptographic algorithm to the random sample to generate the random number, and send, in response to the request, the random number to the device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Embodiments discussed herein include techniques, systems, and devices configured to capture high entropy measurements from a number of sensors that are used to can be used as a seed value to generate random numbers. For example, embodiments include a contactless card configured with one or more sensors configured to capture measurements of various environmental or physical activity, such as motion, temperature, pressure, and so forth. The data from these measurements may be processed by the contactless card and used to generate random numbers. In addition, the random numbers may be furthered used to generate cryptographic keys and/or provided to other devices.

Today's contactless cards currently do not have the capability to generate high entropy data and random numbers. Embodiments discussed herein provide advantages over current contactless cards by including one or more sensors configured to collect measurements and instructions configured to process the data to generate random numbers. Thus, embodiments are discussed herein provide a convenient way to capture high entropy data that can be used to create random numbers to generate secure keys and for other devices to use in their processing. These and other details will become more apparent in the following description.

Figure 1:
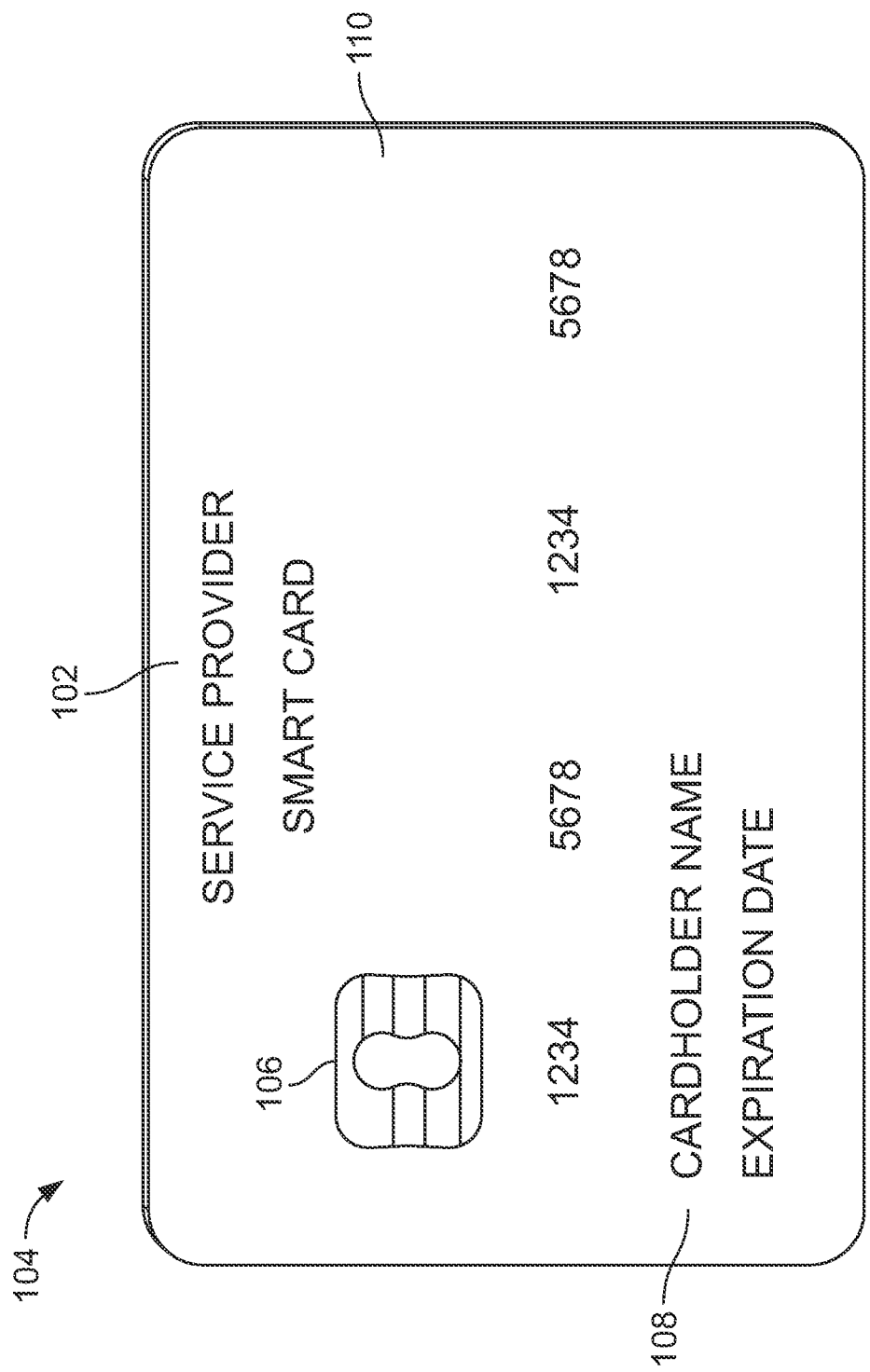
FIG. 1 illustrates a contactless card 104 in accordance with one embodiment.

FIG. 1 illustrates an example configuration of a contactless card 104, which may include a contactless card, a payment card, such as a credit card, debit card, or gift card, issued by a service provider as displayed as service provider indicia 102 on the front or back of the contactless card 104. In some examples, the contactless card 104 is not related to a payment card, and may include, without limitation, an identification card. In some examples, the transaction card may include a dual interface contactless payment card, a rewards card, and so forth. The contactless card 104 may include a substrate 110, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 104 may have physical characteristics compliant with the ID-1 format of the ISO/IEC 7816 standard, and the transaction card may otherwise be compliant with the ISO/IEC 14443 standard. However, it is understood that the contactless card 104 according to the present disclosure may have different characteristics, and the present disclosure does not require a transaction card to be implemented in a payment card.

The contactless card 104 may also include identification information 108 displayed on the front and/or back of the card, and a contact pad 106. The contact pad 106 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 104 may also include processing circuitry, antenna and other components as will be further discussed in FIG. 2. These components may be located behind the contact pad 106 or elsewhere on the substrate 110, e.g., within a different layer of the substrate 110, and may electrically and physically coupled with the contact pad 106. The contactless card 104 may also include a magnetic strip or tape, which may be located on the back of the card (not shown in FIG. 1). The contactless card 104 may also include a Near-Field Communication (NFC) device coupled with an antenna capable of communicating via the NFC protocol. Embodiments are not limited in this manner.

Figure 2:
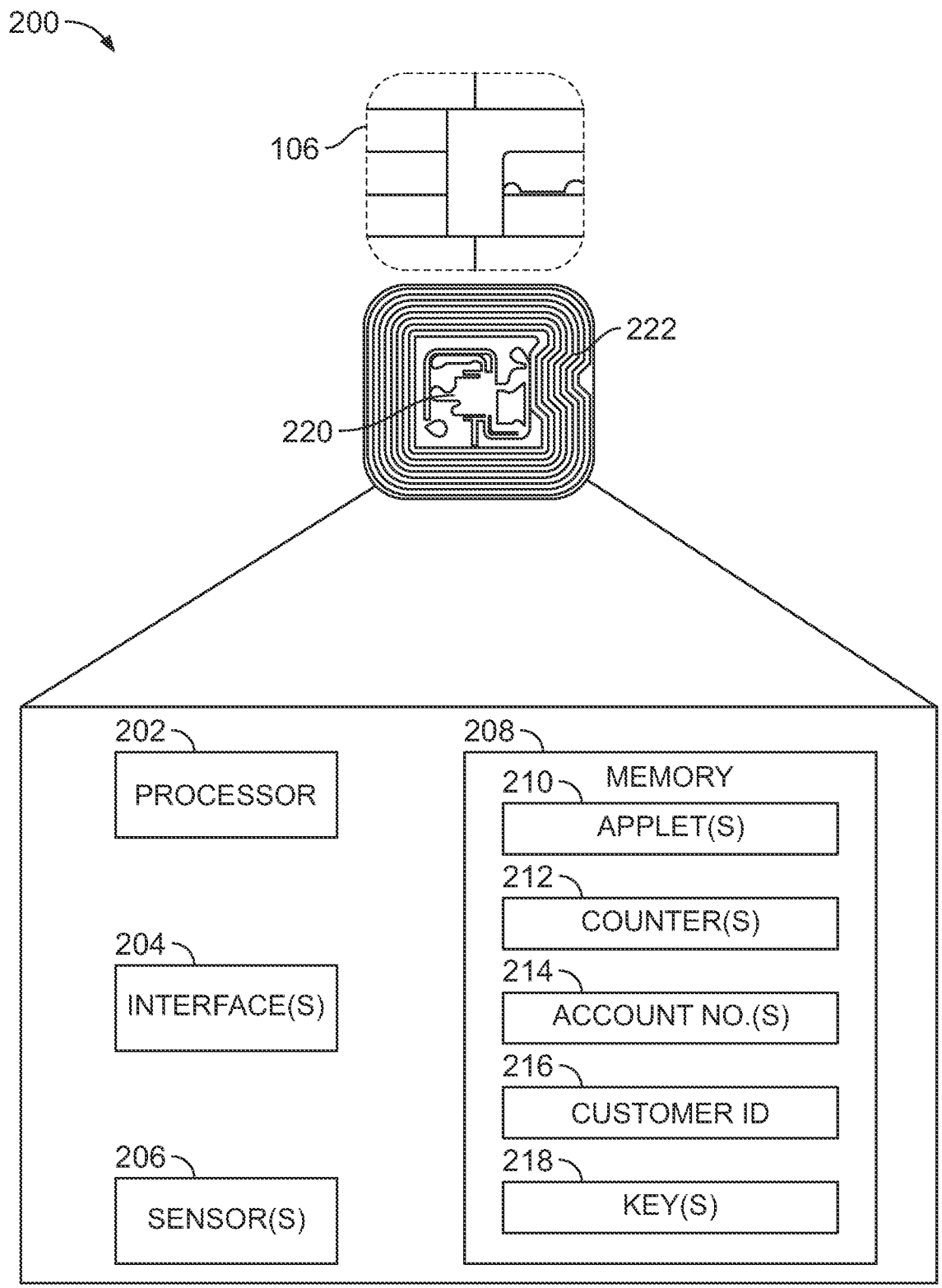
FIG. 2 illustrates a transaction card component 200 in accordance with one embodiment.

As illustrated in FIG. 2, the contact pad 106 of contactless card 104 may include processing circuitry 220 for storing, processing, and communicating information, including a processor 202, a memory 208, and one or more interface(s) 204. It is understood that the processing circuitry 220 may contain additional components, including processors, memories, error and parity/CRC checkers, data encoders, anticollision algorithms, controllers, command decoders, security primitives and tamper proofing hardware, as necessary to perform the functions described herein.

The memory 208 may be a read-only memory, write-once read-multiple memory or read/write memory, e.g., RAM, ROM, and EEPROM, and the contactless card 104 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 208 may be encrypted memory utilizing an encryption algorithm executed by the processor 202 to encrypted data.

The memory 208 may be configured to store one or more applet(s) 210, one or more counter(s) 212, a customer identifier 216, and the account number(s) 214, which may be virtual account numbers. The one or more applet(s) 210 may comprise one or more software applications configured to execute on one or more contactless cards, such as a Java® Card applet. However, it is understood that applet(s) 210 are not limited to Java Card applets, and instead may be any software application operable on contactless cards or other devices having limited memory. The one or more counter(s) 212 may comprise a numeric counter sufficient to store an integer. The customer identifier 216 may comprise a unique alphanumeric identifier assigned to a user of the contactless card 104, and the identifier may distinguish the user of the contactless card from other contactless card users. In some examples, the customer identifier 216 may identify both a customer and an account assigned to that customer and may further identify the contactless card 104 associated with the customer's account. As stated, the account number(s) 214 may include thousands of one-time-use virtual account numbers associated with the contactless card 104. An applet(s) 210 of the contactless card 104 may be configured to manage the account number(s) 214 (e.g., to select an account number(s) 214, mark the selected account number(s) 214 as used, and transmit the account number(s) 214 to a mobile device for auto filling by an auto filling service.

The processor 202 and memory elements of the foregoing exemplary embodiments are described with reference to the contact pad 106, but the present disclosure is not limited thereto. It is understood that these elements may be implemented outside of the contact pad 106 or entirely separate from it, or as further elements in addition to processor 202 and memory 208 elements located within the contact pad 106.

In some examples, the contactless card 104 may comprise one or more antenna(s) 222. The one or more antenna(s) 222 may be placed within the contactless card 104 and around the processing circuitry 220 of the contact pad 106. For example, the one or more antenna(s) 222 may be integral with the processing circuitry 220 and the one or more antenna(s) 222 may be used with an external booster coil. As another example, the one or more antenna(s) 222 may be external to the contact pad 106 and the processing circuitry 220.

In an embodiment, the coil of contactless card 104 may act as the secondary of an air core transformer. The terminal may communicate with the contactless card 104 by cutting power or amplitude modulation. The contactless card 101 may infer the data transmitted from the terminal using the gaps in the contactless card's power connection, which may be functionally maintained through one or more capacitors. The contactless card 104 may communicate back by switching a load on the contactless card's coil or load modulation. Load modulation may be detected in the terminal's coil through interference. More generally, using the antenna(s) 222, processor 202, and/or the memory 208, the contactless card 101 provides a communications interface to communicate via NFC, Bluetooth, and/or Wi-Fi communications.

As explained above, contactless card 104 may be built on a software platform operable on smart cards or other devices having limited memory, such as JavaCard, and one or more or more applications or applets may be securely executed. Applet(s) 210 may be added to contactless cards to provide a one-time password (OTP) for multifactor authentication (MFA) in various mobile application-based use cases. Applet(s) 210 may be configured to respond to one or more requests, such as near field data exchange requests, from a reader, such as a mobile NFC reader (e.g., of a mobile device or point-of-sale terminal), and produce an NDEF message that comprises a cryptographically secure OTP encoded as an NDEF text tag.

One example of an NDEF OTP is an NDEF short-record layout (SR=1). In such an example, one or more applet(s) 210 may be configured to encode the OTP as an NDEF type 4 well known type text tag. In some examples, NDEF messages may comprise one or more records. The applet(s) 210 may be configured to add one or more static tag records in addition to the OTP record.

In some examples, the one or more applet(s) 210 may be configured to emulate an RFID tag. The RFID tag may include one or more polymorphic tags. In some examples, each time the tag is read, different cryptographic data is presented that may indicate the authenticity of the contactless card. Based on the one or more applet(s) 210, an NFC read of the tag may be processed, the data may be transmitted to a server, such as a server of a banking system, and the data may be validated at the server.

In some examples, the contactless card 104 and server may include certain data such that the card may be properly identified. The contactless card 104 may include one or more unique identifiers (not pictured). Each time a read operation takes place, the counter(s) 212 may be configured to increment. In some examples, each time data from the contactless card 104 is read (e.g., by a mobile device), the counter(s) 212 is transmitted to the server for validation and determines whether the counter(s) 212 are equal (as part of the validation) to a counter of the server.

The one or more counter(s) 212 may be configured to prevent a replay attack. For example, if a cryptogram has been obtained and replayed, that cryptogram is immediately rejected if the counter(s) 212 has been read or used or otherwise passed over. If the counter(s) 212 has not been used, it may be replayed. In some examples, the counter that is incremented on the card is different from the counter that is incremented for transactions. The contactless card 101 is unable to determine the application transaction counter(s) 212 since there is no communication between applet(s) 210 on the contactless card 104.

In some examples, the counter(s) 212 may get out of sync. In some examples, to account for accidental reads that initiate transactions, such as reading at an angle, the counter(s) 212 may increment but the application does not process the counter(s) 212. In some examples, when the mobile device 10 is woken up, NFC may be enabled and the device 110 may be configured to read available tags, but no action is taken responsive to the reads.

To keep the counter(s) 212 in sync, an application, such as a background application, may be executed that would be configured to detect when the mobile device 110 wakes up and synchronize with the server of a banking system indicating that a read that occurred due to detection to then move the counter 104 forward. In other examples, Hashed One Time Password may be utilized such that a window of mis-synchronization may be accepted. For example, if within a threshold of 10, the counter(s) 212 may be configured to move forward. But if within a different threshold number, for example within 10 or 1300, a request for performing re-synchronization may be processed which requests via one or more applications that the user tap, gesture, or otherwise indicate one or more times via the user's device. If the counter(s) 212 increases in the appropriate sequence, then it possible to know that the user has done so.

The key diversification technique described herein with reference to the counter(s) 212, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 104, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 104. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

The authentication message may be delivered as the content of a text NDEF record in hexadecimal ASCII format. In another example, the NDEF record may be encoded in hexadecimal format.

The contactless card 104 may include sensor(s) 206 configured to take measurements and collect data in embodiments. The data may also be used to generate one or more random numbers. For example, a random sample of the data may be used as a seed value for a cryptographic algorithm, such as a random number generator configured to generate random numbers. The sensor(s) 206 may include an accelerometer, a thermometer, a magnetometer, a gyroscope, a pressure sensor, and so forth. For example, the accelerometer may be configured to generate data representing the characteristics of interactions, attempted interactions, and/or general motion of the contactless card. The data generated by the accelerometer, e.g., accelerometer data, may include numeric values representing the magnitude and direction of the acceleration of the contactless card 104 as a vector quantity.

In another example, the contactless card 104 may include a thermometer device configured to measure temperature. The thermometer device may be any device configured to measure temperature, such as a silicon bandgap temperature sensor implemented in the processing circuitry 220. The silicon bandgap temperature sensor (a diode) may be implemented with an electronic circuit, such as the Brokaw bandgap reference, that measures AVBE, where V is the voltage, B is the Base, and E is the emitter of the diode, and, therefore, be used to calculate the temperature of the diode. The output of the thermometer device may be a number that can be scaled into a temperature in Celsius, Fahrenheit, Kelvin, etc. In some embodiments, the thermometer measures the temperature of the processing circuitry or the ambient temperature.

In some embodiments, the sensor(s) 206 may include a magnetometer configured to measure a magnetic field or magnetic dipole moment. In some instances, the magnetometer may measure a magnetic field's direction, strength, or relative change at a particular location. The magnetometer may be a vector magnetometer configured to measure the vector components of a magnetic field. In another example, the magnetometer may be a total field magnetometer or scalar magnetometer configured to measure the magnitude of the vector magnetic field. Examples of a magnetometer include an inductive sensor, vibrating-sample magnetometer, a pulsed-field extraction magnetometer, a torque magnetometer, a faraday force magnetometer, or an optical magnetometer. In some instances, the magnetometer may be a two-dimensional (2D) silicon magnetometer or a Silicon Carbide magnetometer implemented in the processing circuitry. Embodiments are not limited in this manner.

In embodiments, the sensor(s) 206 may include a gyroscope device configured to measure orientation and angular velocity. For example, the gyroscope may measure and output readings of the orientation and angular velocity of the contactless card 104. In some instances, the gyroscope may be implemented in the accelerometer. Other examples of gyroscopes included on the contactless card 104 include a microelectromechanical systems (MEMS) gyroscope, a hemispherical resonator gyroscope, and a vibrating structure gyroscope, and a dynamically tuned gyroscope. Embodiments are not limited to these examples.

The sensor(s) 206 may also include a pressure sensor configured to measure the pressure of a gas or liquid, such as atmospheric pressure. In embodiments, the pressure sensor can operate as a transducer; it generates a signal as a function of the pressure imposed. In some instances, the pressure sensor can also be configured to measure other variables such as fluid/gas flow, speed, water level, and altitude. A pressure sensor may include a pressure transducer, pressure transmitter, pressure sender, pressure indicator, piczometer, and a manometer. Examples of a pressure sensor may include a piezoresistive strain gauge sensor used to detect the piezoresistive effect of bonded or formed strain gauges to detect strain due to applied pressure, resistance increasing as pressure deforms the material, e.g., the material of a contactless card 104. Other examples include a capacitive sensor, an electromagnetic sensor, a piezoelectric sensor, a strain-gauge sensor, an optical sensor, a potentiometric sensor, and a force balancing sensor.

In embodiments, the contactless card 104 may include hardware, software, or a combination thereof to process and utilize the data or output from the sensor(s) 206 to generate random numbers. For example, at least a portion of the processing circuitry 220 may be implemented to perform a cryptographic algorithm to generate a random number using data from the sensor(s) 206 as a seed for the algorithm. Specifically, the sensor(s) 206 may make measurements and store the generated data in a memory 208, and the circuitry may be configured to retrieve the data, perform one or more data manipulation techniques, e.g., sampling, normalization, and combining operations to generate sampled data or a seed value that may be used as an input to the cryptographic algorithm. The processing circuitry may retrieve the manipulated data and apply the cryptographic algorithm to generate the random number. The processing circuitry may be further configured to store the random number in memory, which may be used to perform other operations, including generating a pair of keys, e.g., diversified keys, or to provide to another device over an interface.

In embodiments, the contactless card 104 may have software or an applet(s) 210, such as a random number generator applet, configured to process the data from the sensor(s) 206, generate the random numbers, and perform the additional operations (e.g., generate keys or communicate the data). For example, the applet(s) 210 may be configured to randomly sample and/or retrieve data from memory generated by the sensor(s) 206 and apply one or more manipulation operations (e.g., normalization and combination). Note that in some instances, the contactless card 104 may only include a single sensor(s) 206 generating data (e.g., an accelerometer) and may not need to normalize and combine data. In these instances, the applet(s) 210 may retrieve data from memory and utilize the data as a seed value for the cryptographic algorithm to generate the random number.

The random number generator (RNG) applet may randomly retrieve or sample the data from memory. In embodiments, the seed value can be any length or include any amount of data that the cryptographic algorithm may use to generate a random number. A higher quality seed value (more random) will be based on data collected from the sensor(s) 206 under high entropy circumstances (e.g., random motion detected by an accelerometer). In some instances, the RNG applet may determine the randomness of the data prior to using it as a seed value to ensure that it is sufficiently random. For example, the RNG applet may be configured to detect patterns in data and discard the data if detected. In one example, a pattern may include detections made by an accelerometer when a person having the contactless card 104 is walking. Data corresponding to these readings may be discarded for use by the cryptographic algorithm. A similar analysis may be applied to data from other sensor types (e.g., constant temperature readings, pressure readings, magnetic field readings, etc.).

In embodiments, the RNG applet may include one or more functions that may perform operations on data collected from multiple sensor(s) 206. For example, data from the different sensor(s) 206 will be on different scales, and readings from one sensor may weigh a seed value to heavily reducing the benefit gained by using multiple sensor(s) 206. The RNG applet may normalize the data from the multiple sensor(s) 206 to the same scale or range of values. For example, the data from the multiple sensor(s) 206 may be normalized to a value in the range from 0 to 1, ensuring high-value readings will not heavily weigh a seed value. Embodiments are not limited to this example, and other ranges or normalization techniques may be used on the data.

The RNG applet may also be configured to perform one or more operations to combine data from multiple sensor(s) 206. For example, the RNG applet may apply one or more mathematical operations, such as adding and/or multiplying the data, to combine the data to use as a seed value. These combination techniques may be applied after the data is normalized and on the same scale. Once combined, the data may be used as the seed value to the cryptographic algorithm to generate a random number. Embodiments are not limited to adding and/or multiplying the data, and other combinatorial techniques may be applied to combine the data, and the RNG applet may be configured to apply the technique.

In embodiments, the RNG applet may perform one or more of the operations on the data and store the data in memory 208, which can be used as a seed value to the cryptographic algorithm to generate a random number. In embodiments, the RNG applet may generate a new random number on a periodic, semi-periodic, or non-periodic basis. In some instances, the RNG applet may execute to generate a random number when power is applied to the contactless card 104. For example, the contactless card 104 may include a battery to supply power to the card. In other instances, the contactless card 104 may receive power from a wireless interface, such as an RF or NFC interface. In some embodiments, the contactless card 104 may be powered by the motion of the card. The RNG applet may execute any time power is applied to the card.

Similarly, the sensor(s) 206 may take measurements and collect data when power is applied to the contactless card 104 and the sensor(s) 206. The sensor(s) 206 may collect the data and store the data in memory 208. In some embodiments, the sensor(s) 206 may be allocated a limited amount of memory 208, and data from the sensor(s) 206 may be discarded from time to time. For example, the portion of the memory to store the data may be configured as a first-in-first-out buffer, and data may be overwritten as new data is provided by the sensor(s) 206. As previously discussed, the RNG applet may also be configured to detect and remove (e.g., allocate the memory for use) data that is not random or taken under low entropy situations.

In embodiments, the RNG applet may generate one or more random numbers and store the random numbers in memory 208 for use to perform additional operations. For example, the random numbers may be used to generate a pair of keys, as discussed herein. The pair of keys may include a private key and a public key, which may be used to secure and/or authentic data. For example, the contactless card 104 may be configured to share (e.g., wireless communicate), the public key with other devices, and sign data with the private key. The other devices may then utilize the public key to authenticate the signed data and comes from the contactless card 104. Under some circumstances, the contactless card 104 may be configured to securely share the private key with another device, such as a customer's mobile device or a secure server. The contactless card 104 may then be configured to encrypt sensitive data with the public key, which may only be decrypted with the shared private key.

In some embodiments, the contactless card 104 may be used as a random number generator itself and provide random numbers to other devices for their usage (e.g., generate pairs of keys). For example, the contactless card 104 may be configured to store the random numbers in memory 208, which may be read and/or provided to another device via an interface, such as an NFC interface. Another device may perform an NFC read operation, and a random number may be provided by the contactless card 104 in an NFC format (NDEF). The contactless card 104 may discard a random number from memory once it is provided to another device.

In embodiments, the RNG applet may be configured to generate random numbers of any size and/or within the limits of the memory 208 but sufficient to ensure randomness. In one example, the RNG applet may generate a random number of 256 bits of data. However, embodiments are not limited in this manner. Additional details will be discussed in the following routines and descriptions.

Figure 3:
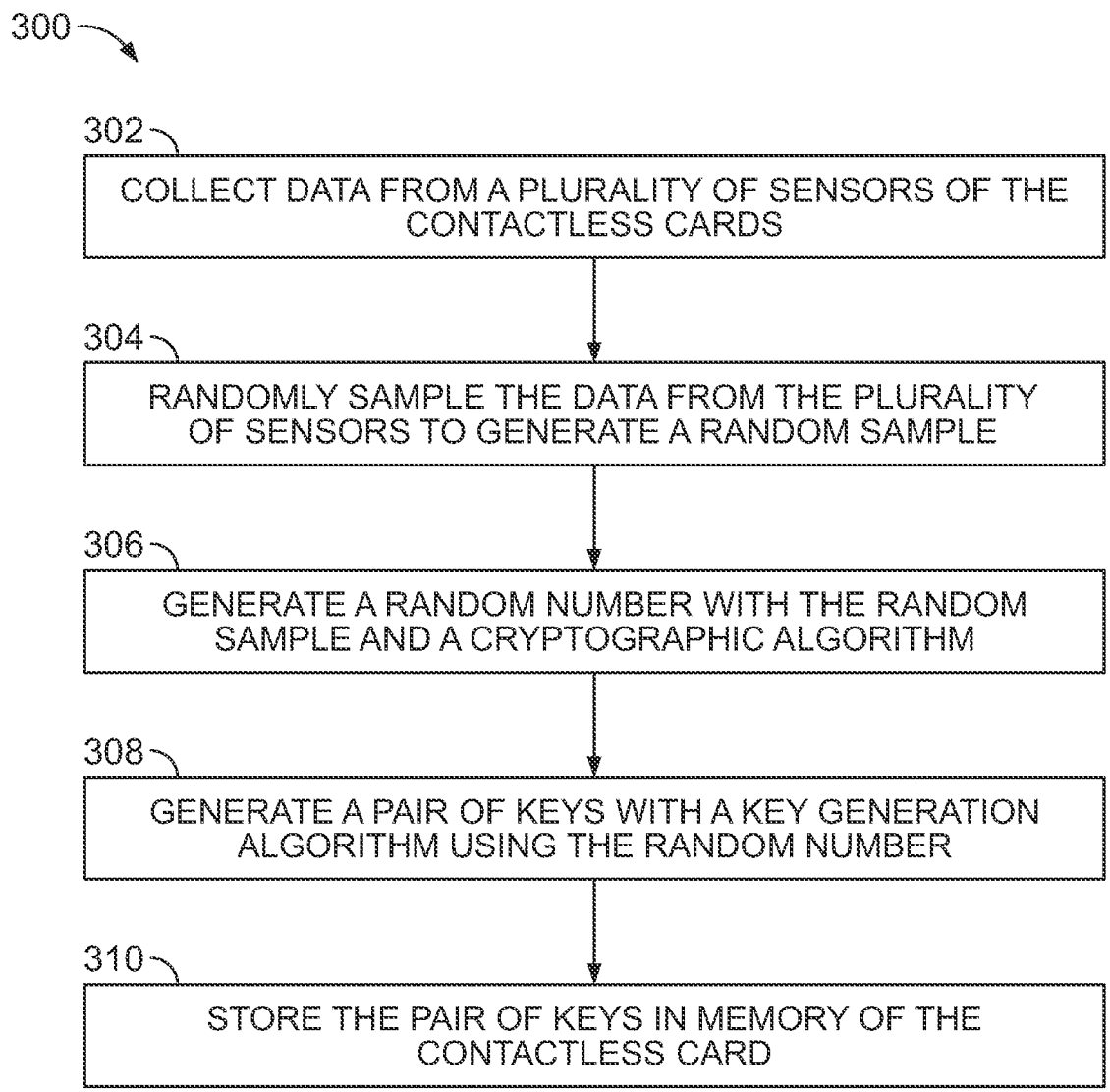
FIG. 3 illustrates a routine 300 in accordance with one embodiment.

FIG. 3 illustrates an example of a routine 300 that may be performed in accordance with the embodiments discussed. For example, one or more of the operations may be performed by a contactless card 104, including sensor(s) 206 and one or more processor(s) 202 to generate random numbers to generate keys that may be used with cryptographic algorithms.

In block 302, the routine 300 includes collecting data from a plurality of sensors of the contactless card. For example, the sensor(s) 206 of the contactless card 104 may be configured to perform measurements and store the data in the memory of the card. The data may be collected by sensors such as an accelerometer, a thermometer, a magnetometer, a gyroscope, a pressure sensor, and so forth, and include measurements of motion, temperature, magnetic field, pressure, etc., as previously discussed. The sensor(s) 206 may collect and store the data on a periodic basis or randomly (e.g., when the contactless card 104 is powered, motion is occurring, a magnetic field is detected, etc.).

In block 304, the routine 300 includes randomly sampling the data from the plurality of sensors to generate a random sample. For example, the contactless card 104, including circuitry and instructions, may retrieve at least a portion of data from memory measured by the sensor(s) 206. The portion of data may be of a particular size (e.g., in bits) based on seeding requirements for a cryptographic algorithm or may be a random size. In some instances, the contactless card 104 may generate the random sample from the data by applying a one way function to the data, such as a hash algorithm. Embodiments are not limited in this manner.

In block 306, the routine 300 includes generating a random number with the random sample and a cryptographic algorithm. Specifically, the contactless card 104, including circuitry and instructions, may utilize the random sample as a seed value for a cryptographic algorithm to generate a random number. In some embodiments, the contactless card 104 may perform one or more manipulation operations on the random sample prior to generating the random number (e.g., normalization and combination operations).

In block 308, routine 300 includes generating a pair of keys with a key generation algorithm using the random number. The pair of keys may include a private key and a public key. The key generation algorithm may be any type of key generation algorithm, as discussed herein. Further, and in block 310, routine 300 includes storing the pair of keys in memory of the contactless card by the processing circuitry.

Figure 4:
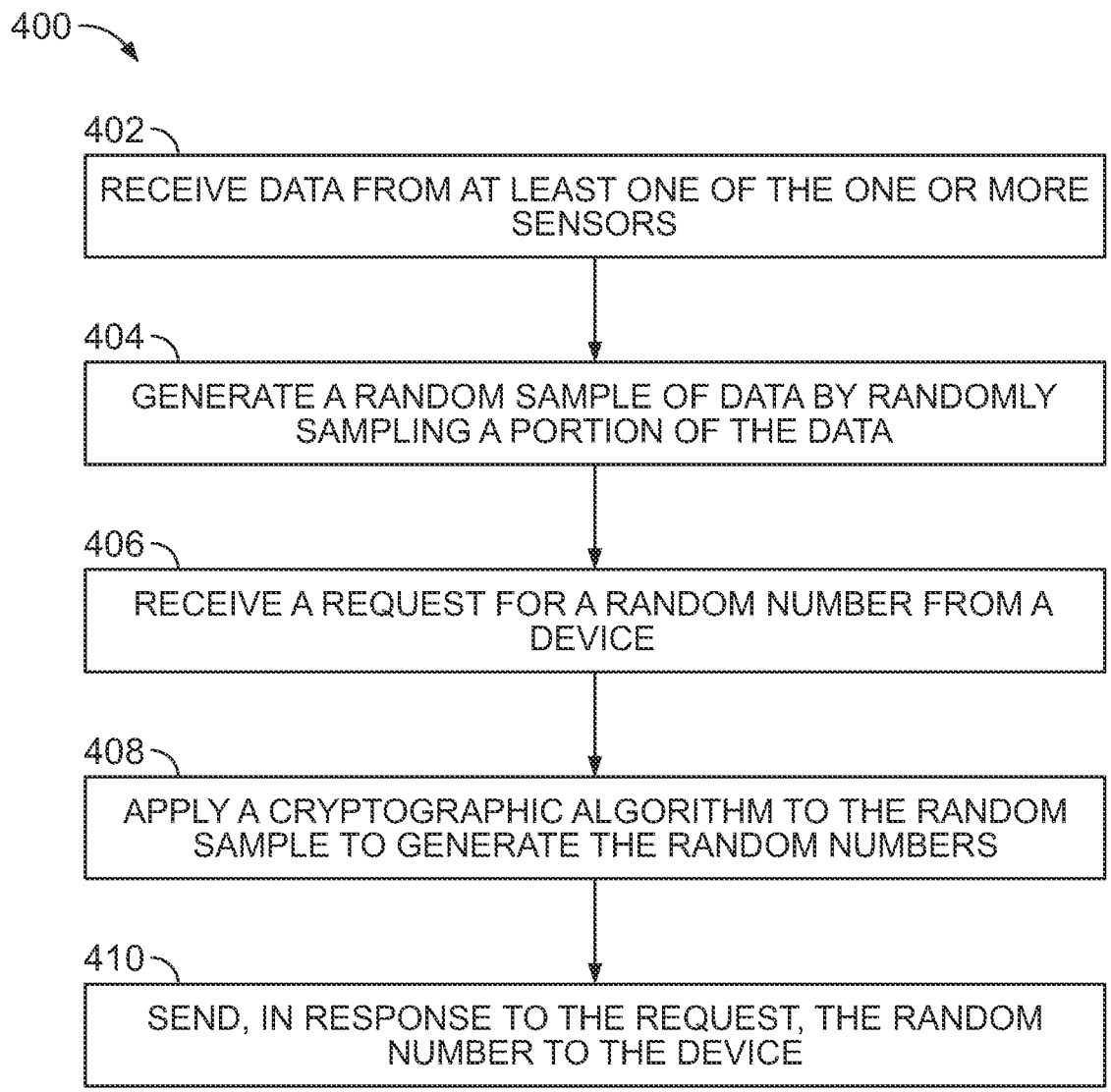
FIG. 4 illustrates a routine 400 in accordance with one embodiment.

FIG. 4 illustrates an example of a routine 400 that may be performed in accordance with embodiments discussed herein. Specifically, routine 400 may be performed by a contactless card 104 to generate a random number and provide the random number to another device.

In block 402, routine 400 receives data from at least one of the one or more sensors. As discussed herein, the sensor(s) 206 of the contactless card 104 may take measurements based on the type of sensor and store data associated with the measurements in memory. The processing circuitry processing instructions may retrieve the data from the memory to take a random sample and generate a random number.

In block 404, the routine 400 includes generating a random sample of the data by randomly sampling a portion of the data. For example, the processing circuitry may retrieve a particular amount of data stored in the memory to use as a seed value to generate a random number (e.g., 8 bits, 16 bits, etc.). Embodiments are not limited to a particular amount of data. Moreover, a sample may be taken from any portion of memory allocated to store the data from the sensor(s) 206. However, in some instances, the data may be retrieved on a first-in-first-out basis.

In block 406, the routine 400 includes receiving a request for a random number from a device. For example, another device such as a mobile device, a computer, a server, a point-of-sale terminal, etc., may request a random number from the contactless card. Thus, the card can be used as a random number generator for another device to perform operations, such as generating keys for cryptographic operations. The request may be received via an interface(s) 204, such as an NFC interface as an NFC read or get operation. Embodiments are not limited to this example.

In block 408, the routine 400 includes applying a cryptographic algorithm to the random sample to generate the random number. Note that in some instances, that the request for the random number may occur after the card has generated a random number, and embodiments are not limited in this manner. In these instances, the random number may be stored in a memory.

In block 410, the routine 400 includes sending the random number to the device in response to the request. For example, the card may retrieve the random number and communicate it via an interface(s) 204, such as an NFC interface. In embodiments, the random number may be communicated in an NFC message, as discussed herein.

Figure 5:
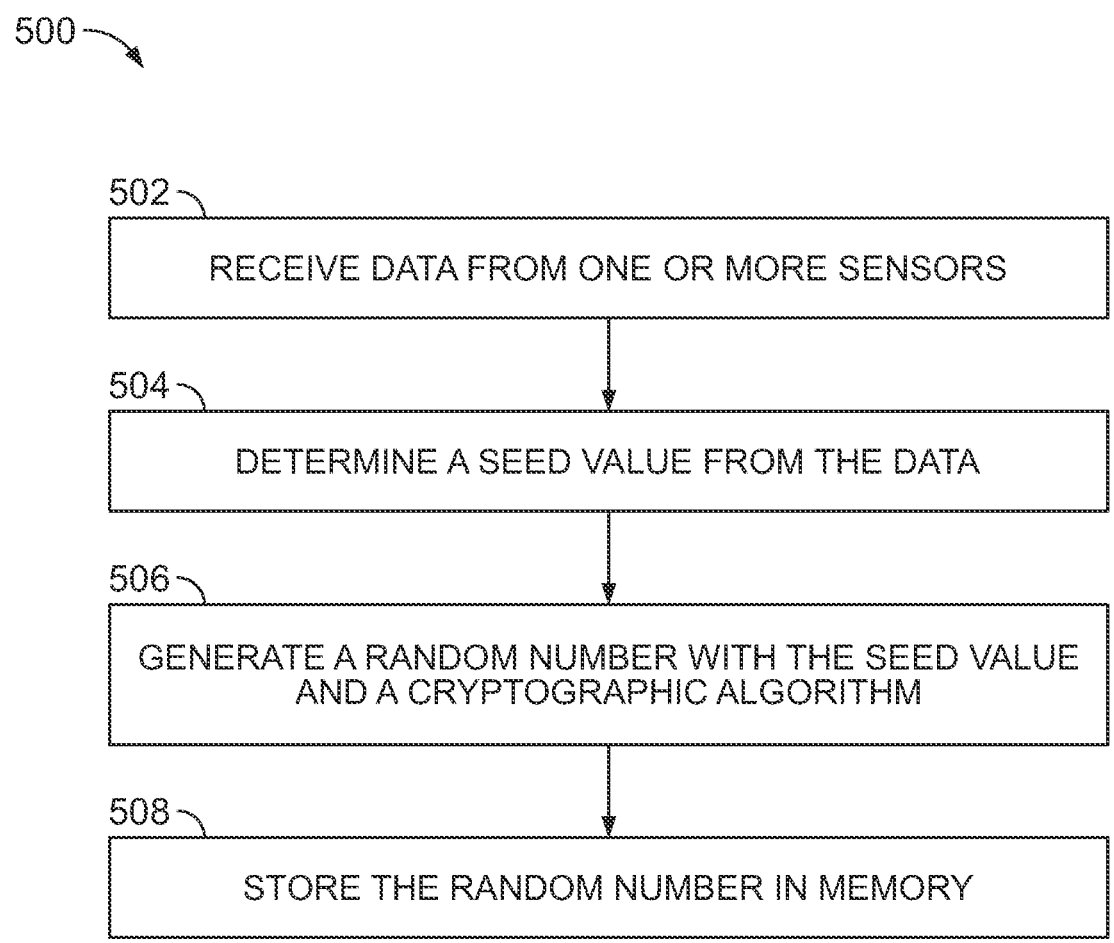
FIG. 5 illustrates a routine 500 in accordance with one embodiment.

FIG. 5 illustrates an example of a routine 500 that may be performed in accordance with embodiments discussed herein. In embodiments, routine 500 may be performed by a contactless card to generate and store a random number. The routine 500 may be performed periodically, when the card is powered, when a particular amount of motion is detected above a threshold amount, etc.

In block 502, the routine 500 receives data from one or more sensors. As previously discussed, the contactless card may include sensor(s) 206 configured to take measurements based on the sensor type.

In block 504, the routine 500 includes determining a seed value from the data. The seed value may be a random sample of the data. In some instances, the data may be pre-processed, e.g., normalized and combined, when the data is from two sensor(s) 206.

In block 506, the routine 500 includes generating a random number with the seed value and a cryptographic algorithm. Specifically, the contactless card may utilize the seed value as an input (starting location) for a cryptographic algorithm configured to generate a random number. The cryptographic algorithm may perform a number of operations and output a random number. Further and in block 508, the routine 500 includes storing the random number in memory.

Figure 6:
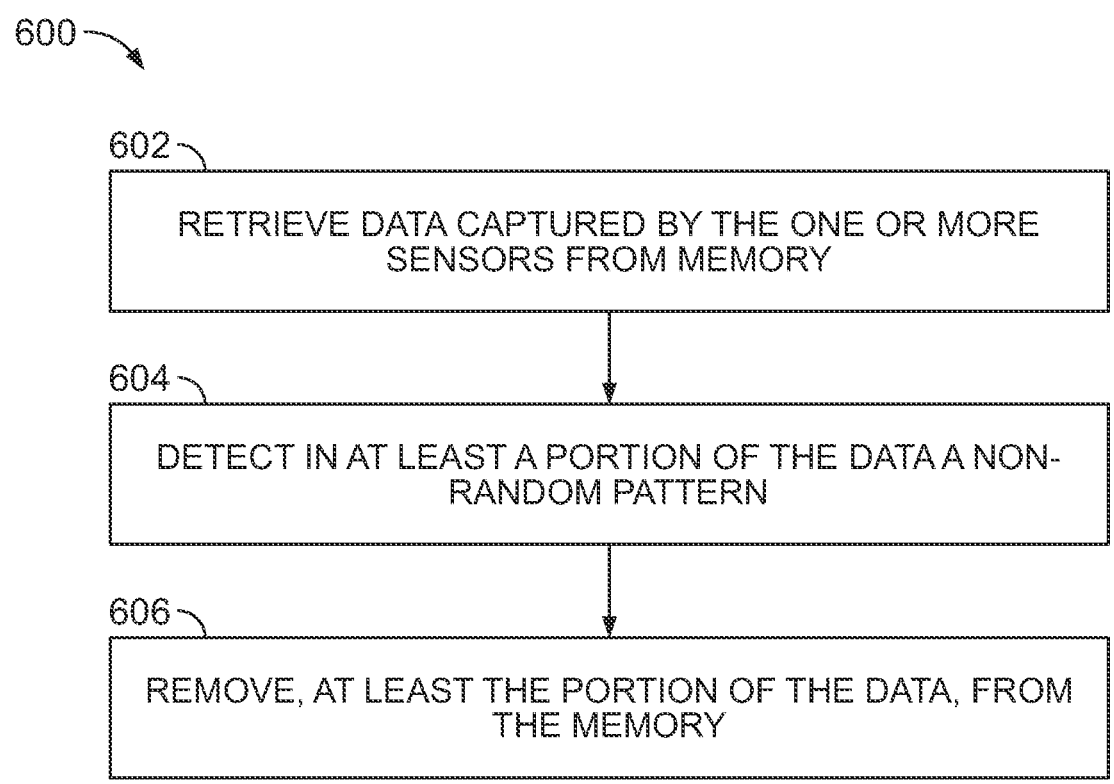
FIG. 6 illustrates a routine 600 in accordance with one embodiment.

FIG. 6 illustrates an example routine 600 that maybe performed in accordance with embodiments. For example, contactless card may perform one or more operations to filter out and/or delete data that includes non-random data, e.g., low entropy data, that is poor to use as a seed value to generate random numbers. FIG. 6 illustrates one possible routine 600 that may be performed by the contactless card to remove the non-random data.

In block 602, routine 600 retrieves data captured by the one or more sensors from memory. In some instances, the processing circuitry of the contactless card may retrieve all of the data in memory allocated to the sensors to store data for measurements. In other instances, the processing circuitry may retrieve a portion of the data from the memory, and analyze the data at a portion at a time. Note that in some instances, the processing circuitry may analyze the data in real-time. In these instances, the processing circuitry may capture the data from the sensors prior to it being written to the memory to analyze. Embodiments are not limited in this manner.

Figure 7:
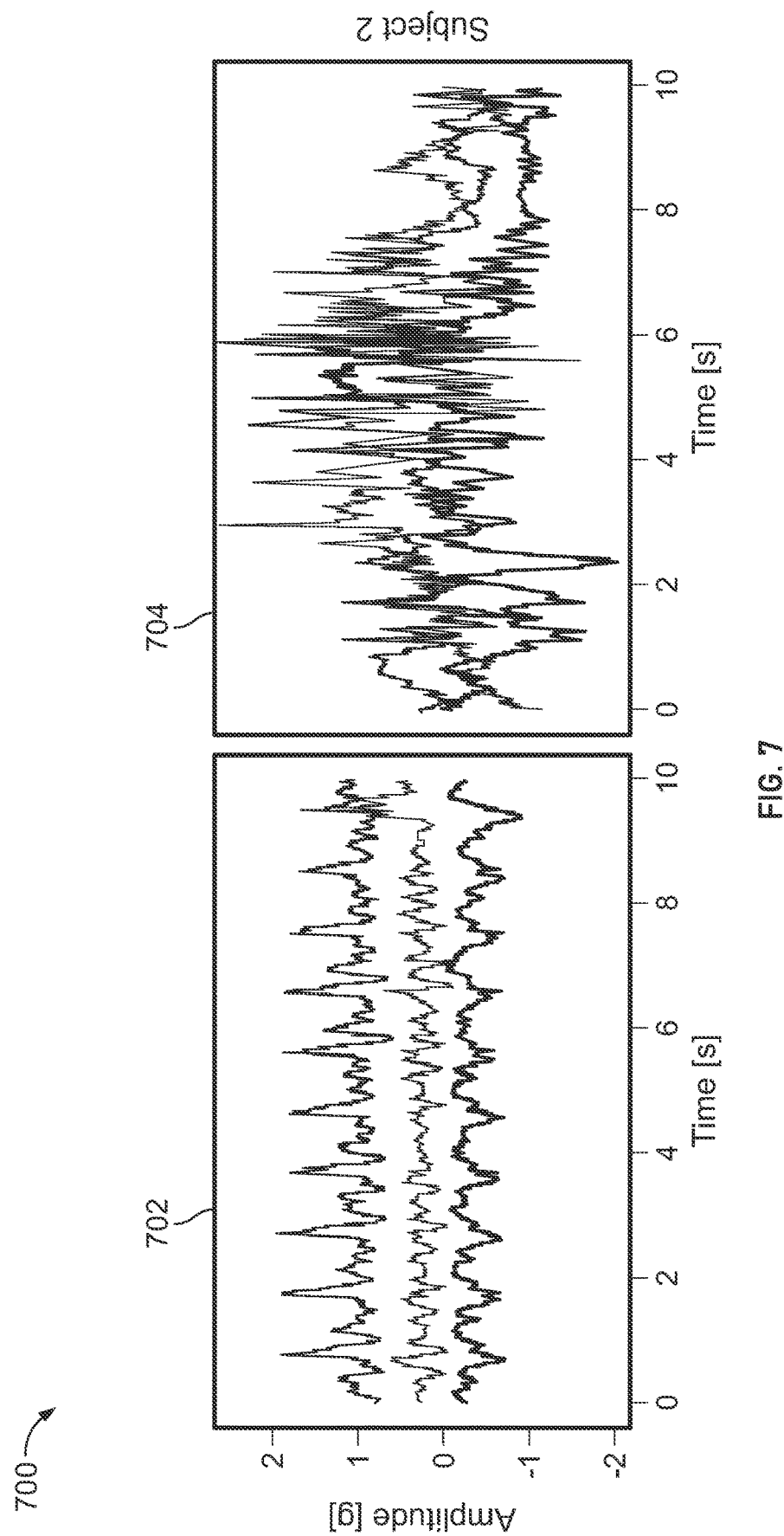
FIG. 7 illustrates an aspect of the subject matter in accordance with one embodiment.

In block 604, routine 600 detects in at least a portion of the data a non-random pattern. Specifically, the processing circuitry of the contactless card may analyze the data and look for non-random data. The non-random data may include measurements that have a periodic frequency. FIG. 7 illustrates measurement graphs 700 of measurements performed by an accelerometer. Graph 702 includes data that has periodic measurements. In the illustrated example, the measurements are based on someone walking having a periodic gait. As can be seen in the graph 702, the amplitude of each measurement spikes in accordance with a particular pattern, e.g., approximately every second. Alternatively, graph 704 includes measurements that include random patterns and are of someone moving around in a random manner. The processing circuitry executing instruction is configured to the detect the non-random pattern by analyzing for repeating patterns that occur in periodic episodes. If the processing circuitry does not detect non-random data, the processing circuitry may use the data to generate random values. However, if the processing circuitry detects a non-random pattern, the processing circuitry may discard the data.

In block 606, routine 600 removes, at least the portion of the data, from the memory that includes non-random data. In some instances, the processing circuitry may cause the memory space holding the portion of data to be free for use to store additional data. In other instances, the processing circuitry may prevent the portion of the data to be written to memory.

Figure 8:
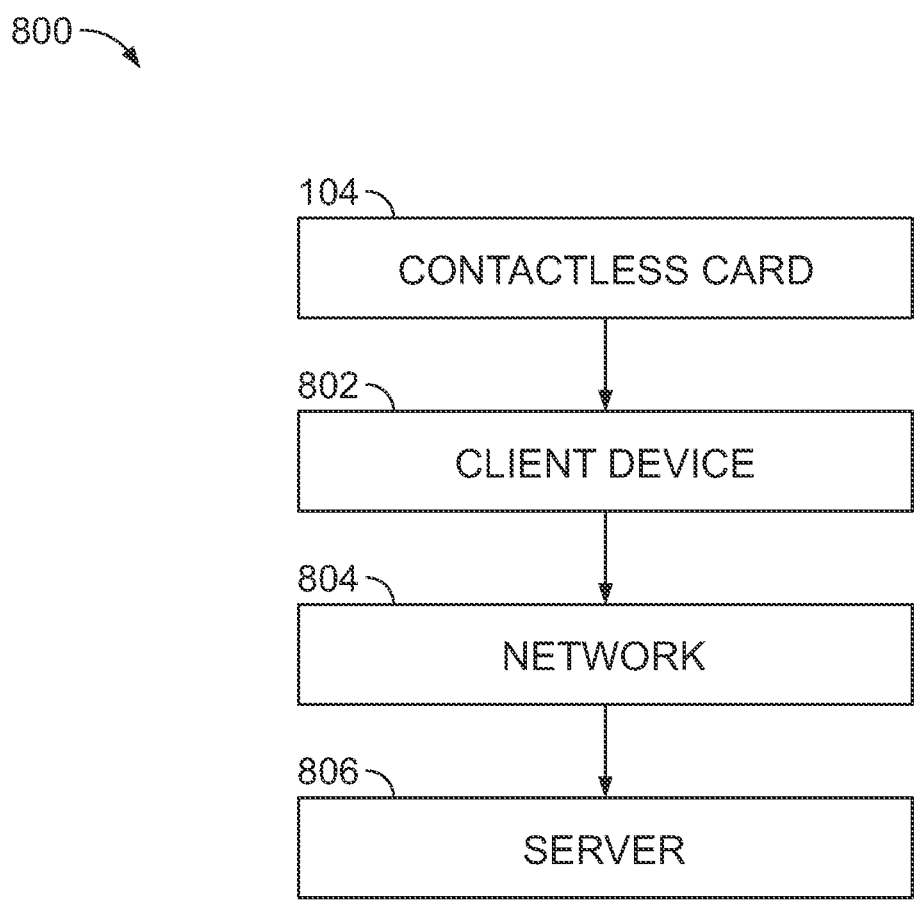
FIG. 8 illustrates an aspect of the subject matter in accordance with one embodiment.

FIG. 8 illustrates a data transmission system 800 according to an example embodiment. As further discussed below, system 800 may include contactless card 104, client device 802, network 804, and server 806. Although FIG. 8 illustrates single instances of the components, system 800 may include any number of components.

System 800 may include one or more contactless cards 104, which are further explained below. In some embodiments, contactless card 104 may be in wireless communication, utilizing NFC in an example, with client device 802.

System 800 may include client device 802, which may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. client device 104 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 802 device can include a processor and a memory, and it is understood that the processing circuitry may contain additional components, including processors, memories, error and parity/CRC checkers, data encoders, anticollision algorithms, controllers, command decoders, security primitives and tamperproofing hardware, as necessary to perform the functions described herein. The client device 104 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

In some examples, client device 802 of system 800 may execute one or more applications, such as software applications, that enable, for example, network communications with one or more components of system 800 and transmit and/or receive data.

The client device 802 may be in communication with one or more server(s) 806 via one or more network(s) 804, and may operate as a respective front-end to back-end pair with server 806. The client device 802 may transmit, for example from a mobile device application executing on client device 802, one or more requests to server 806. The one or more requests may be associated with retrieving data from server 806. The server 806 may receive the one or more requests from client device 802. Based on the one or more requests from client device 802, server 806 may be configured to retrieve the requested data from one or more databases (not shown). Based on receipt of the requested data from the one or more databases, server 806 may be configured to transmit the received data to client device 802, the received data being responsive to one or more requests.

System 800 may include one or more networks 804. In some examples, network 804 may be one or more of a wireless network, a wired network or any combination of wireless network and wired network, and may be configured to connect client device 802 to server 806. For example, network 804 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11 family of networking, Bluetooth, NFC, Radio Frequency Identification (RFID), Wi-Fi, and/or the like.

In addition, network 804 may include, without limitation, telephone lines, fiber optics, IEEE Ethernet 802.3, a wide area network, a wireless personal area network, a LAN, or a global network such as the Internet. In addition, network 804 may support an Internet network, a wireless communication network, a cellular network, or the like, or any combination thereof. network 804 may further include one network, or any number of the exemplary types of networks mentioned above, operating as a stand-alone network or in cooperation with each other. network 804 may utilize one or more protocols of one or more network elements to which they are communicatively coupled. network 804 may translate to or from other protocols to one or more protocols of network devices. Although network 804 is depicted as a single network, it should be appreciated that according to one or more examples, network 804 may comprise a plurality of interconnected networks, such as, for example, the Internet, a service provider's network, a cable television network, corporate networks, such as credit card association networks, and home networks.

System 800 may include one or more servers 806. In some examples, server 806 may include one or more processors, which are coupled to memory. The server 806 may be configured as a central system, server or platform to control and call various data at different times to execute a plurality of workflow actions. Server 120 may be configured to connect to the one or more databases. The server 806 may be connected to at least one client device 802.

Figure 9:
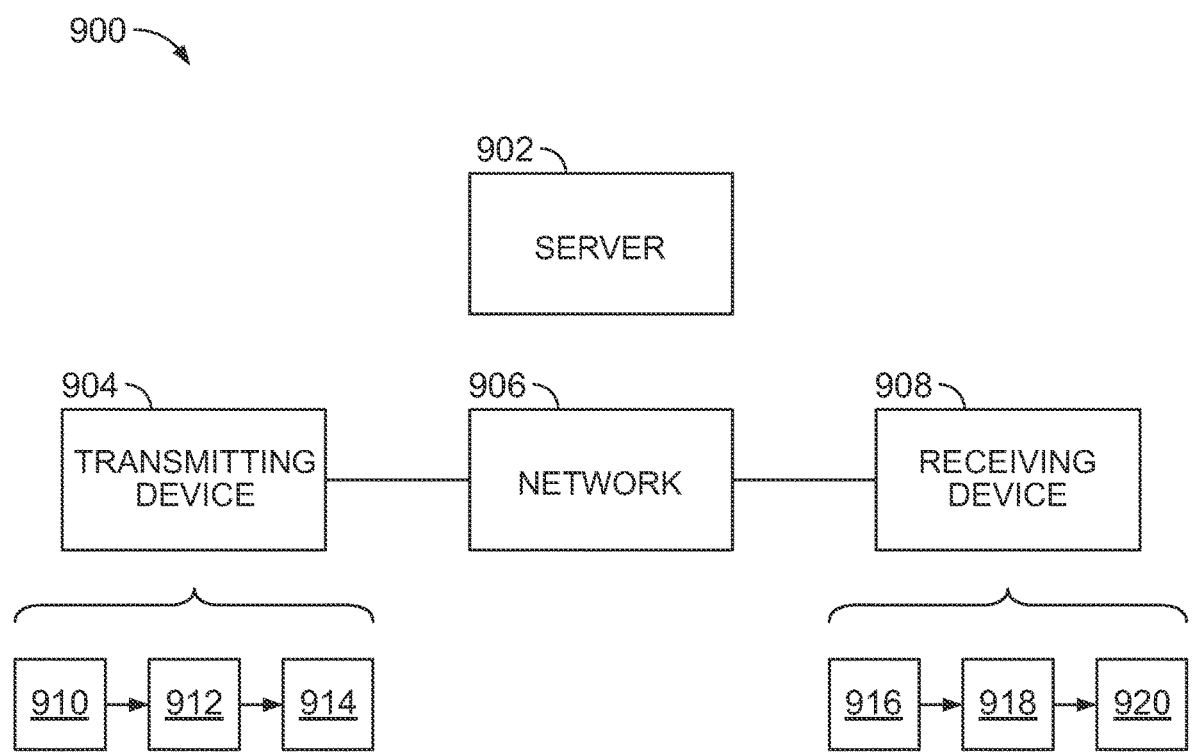
FIG. 9 illustrates an aspect of the subject matter in accordance with one embodiment.

FIG. 9 illustrates a data transmission system according to an example embodiment. System 900 may include a transmitting or transmitting device 904, a receiving or receiving device 908 in communication, for example via network 906, with one or more servers 902. Transmitting or transmitting device 904 may be the same as, or similar to, contactless card 104 discussed above with reference to FIG. 8. Receiving or receiving device 908 may be the same as, or similar to, client device 804 discussed above with reference to FIG. 8. Network 906 may be similar to network 804 discussed above with reference to FIG. 8. Server 902 may be similar to server 806 discussed above with reference to FIG. 8. Although FIG. 9 shows single instances of components of system 900, system 900 may include any number of the illustrated components.

When using symmetric cryptographic algorithms, such as encryption algorithms, hash-based message authentication code (HMAC) algorithms, and cipher-based message authentication code (CMAC) algorithms, it is important that the key remain secret between the party that originally processes the data that is protected using a symmetric algorithm and the key, and the party who receives and processes the data using the same cryptographic algorithm and the same key.

It is also important that the same key is not used too many times. If a key is used or reused too frequently, that key may be compromised. Each time the key is used, it provides an attacker an additional sample of data which was processed by the cryptographic algorithm using the same key. The more data which the attacker has which was processed with the same key, the greater the likelihood that the attacker may discover the value of the key. A key used frequently may be comprised in a variety of different attacks.

Moreover, each time a symmetric cryptographic algorithm is executed, it may reveal information, such as side-channel data, about the key used during the symmetric cryptographic operation. Side-channel data may include minute power fluctuations which occur as the cryptographic algorithm executes while using the key. Sufficient measurements may be taken of the side-channel data to reveal enough information about the key to allow it to be recovered by the attacker. Using the same key for exchanging data would repeatedly reveal data processed by the same key.

However, by limiting the number of times a particular key will be used, the amount of side-channel data which the attacker is able to gather is limited and thereby reduce exposure to this and other types of attack. As further described herein, the parties involved in the exchange of cryptographic information (e.g., sender and recipient) can independently generate keys from an initial shared master symmetric key in combination with a counter value, and thereby periodically replace the shared symmetric key being used with needing to resort to any form of key exchange to keep the parties in sync. By periodically changing the shared secret symmetric key used by the sender and the recipient, the attacks described above are rendered impossible.

Referring back to FIG. 9, system 900 may be configured to implement key diversification. For example, a sender and recipient may desire to exchange data (e.g., original sensitive data) via respective devices 904 and 908. As explained above, although single instances of transmitting device 904 and receiving device 908 may be included, it is understood that one or more transmitting devices 904 and one or more receiving devices 908 may be involved so long as each party shares the same shared secret symmetric key. In some examples, the transmitting device 904 and receiving device 908 may be provisioned with the same master symmetric key. Further, it is understood that any party or device holding the same secret symmetric key may perform the functions of the transmitting device 904 and similarly any party holding the same secret symmetric key may perform the functions of the receiving device 908. In some examples, the symmetric key may comprise the shared secret symmetric key which is kept secret from all parties other than the transmitting device 904 and the receiving device 908 involved in exchanging the secure data. It is further understood that both the transmitting device 904 and receiving device 908 may be provided with the same master symmetric key, and further that part of the data exchanged between the transmitting device 904 and receiving device 908 comprises at least a portion of data which may be referred to as the counter value. The counter value may comprise a number that changes each time data is exchanged between the transmitting device 904 and the receiving device 908.

System 900 may include one or more networks 906. In some examples, network 906 may be one or more of a wireless network, a wired network or any combination of wireless network and wired network, and may be configured to connect one or more transmitting devices 904 and one or more receiving devices 908 to server 902. For example, network 906 may include one or more of a fiber optics network, a passive optical network, a cable network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11 family network, Bluetooth, NFC, RFID, Wi-Fi, and/or the like.

In addition, network 906 may include, without limitation, telephone lines, fiber optics, IEEE Ethernet 802.3, a wide area network, a wireless personal area network, a LAN, or a global network such as the Internet. In addition, network 906 may support an Internet network, a wireless communication network, a cellular network, or the like, or any combination thereof. Network 906 may further include one network, or any number of the exemplary types of networks mentioned above, operating as a stand-alone network or in cooperation with each other. Network 906 may utilize one or more protocols of one or more network elements to which they are communicatively coupled. Network 906 may translate to or from other protocols to one or more protocols of network devices. Although network 906 is depicted as a single network, it should be appreciated that according to one or more examples, network 906 may comprise a plurality of interconnected networks, such as, for example, the Internet, a service provider's network, a cable television network, corporate networks, such as credit card association networks, and home networks.

In some examples, one or more transmitting devices 904 and one or more receiving devices 908 may be configured to communicate and transmit and receive data between each other without passing through network 906. For example, communication between the one or more transmitting devices 904 and the one or more receiving devices 908 may occur via at least one of NFC, Bluetooth, RFID, Wi-Fi, and/or the like.

At block 910, when the transmitting device 904 is preparing to process the sensitive data with symmetric cryptographic operation, the sender may update a counter. In addition, the transmitting device 904 may select an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128; a symmetric HMAC algorithm, such as HMAC-SHA-256; and a symmetric CMAC algorithm such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

At block 912, the transmitting device 904 may take the selected cryptographic algorithm, and using the master symmetric key, process the counter value. For example, the sender may select a symmetric encryption algorithm, and use a counter which updates with every conversation between the transmitting device 904 and the receiving device 908. The transmitting device 904 may then encrypt the counter value with the selected symmetric encryption algorithm using the master symmetric key, creating a diversified symmetric key.

In some examples, the counter value may not be encrypted. In these examples, the counter value may be transmitted between the transmitting device 904 and the receiving device 908 at block 912 without encryption.

At block 914, the diversified symmetric key may be used to process the sensitive data before transmitting the result to the receiving device 908. For example, the transmitting device 904 may encrypt the sensitive data using a symmetric encryption algorithm using the diversified symmetric key, with the output comprising the protected encrypted data. The transmitting device 904 may then transmit the protected encrypted data, along with the counter value, to the receiving device 908 for processing.

At block 916, the receiving device 908 may first take the counter value and then perform the same symmetric encryption using the counter value as input to the encryption, and the master symmetric key as the key for the encryption. The output of the encryption may be the same diversified symmetric key value that was created by the sender.

At block 918, the receiving device 908 may then take the protected encrypted data and using a symmetric decryption algorithm along with the diversified symmetric key, decrypt the protected encrypted data.

At block 920, as a result of the decrypting the protected encrypted data, the original sensitive data may be revealed.

The next time sensitive data needs to be sent from the sender to the recipient via respective transmitting device 904 and receiving device 908, a different counter value may be selected producing a different diversified symmetric key. By processing the counter value with the master symmetric key and same symmetric cryptographic algorithm, both the transmitting device 904 and receiving device 908 may independently produce the same diversified symmetric key. This diversified symmetric key, not the master symmetric key, is used to protect the sensitive data.

As explained above, both the transmitting device 904 and receiving device 908 each initially possess the shared master symmetric key. The shared master symmetric key is not used to encrypt the original sensitive data. Because the diversified symmetric key is independently created by both the transmitting device 904 and receiving device 908, it is never transmitted between the two parties. Thus, an attacker cannot intercept the diversified symmetric key and the attacker never sees any data which was processed with the master symmetric key. Only the counter value is processed with the master symmetric key, not the sensitive data. As a result, reduced side-channel data about the master symmetric key is revealed. Moreover, the operation of the transmitting device 904 and the receiving device 908 may be governed by symmetric requirements for how often to create a new diversification value, and therefore a new diversified symmetric key. In an embodiment, a new diversification value and therefore a new diversified symmetric key may be created for every exchange between the transmitting device 904 and receiving device 908.

In some examples, the key diversification value may comprise the counter value. Other non-limiting examples of the key diversification value include: a random nonce generated each time a new diversified key is needed, the random nonce sent from the transmitting device 904 to the receiving device 908; the full value of a counter value sent from the transmitting device 904 and the receiving device 908; a portion of a counter value sent from the transmitting device 904 and the receiving device 908; a counter independently maintained by the transmitting device 904 and the receiving device 908 but not sent between the two devices; a one-time-passcode exchanged between the transmitting device 904 and the receiving device 908; and a cryptographic hash of the sensitive data. In some examples, the random nonce may be generated by the contactless card 104, as described. Specifically, the contactless card 104 may generate a random nonce from data generated by one or more sensors of the contactless card 104. In some examples, one or more portions of the key diversification value may be used by the parties to create multiple diversified keys. For example, a counter may be used as the key diversification value. Further, a combination of one or more of the exemplary key diversification values described above may be used.

In another example, a portion of the counter may be used as the key diversification value. If multiple master key values are shared between the parties, the multiple diversified key values may be obtained by the systems and processes described herein. A new diversification value, and therefore a new diversified symmetric key, may be created as often as needed. In the most secure case, a new diversification value may be created for each exchange of sensitive data between the transmitting device 904 and the receiving device 908. In effect, this may create a one-time use key, such as a single-use session key.

Figure 10:
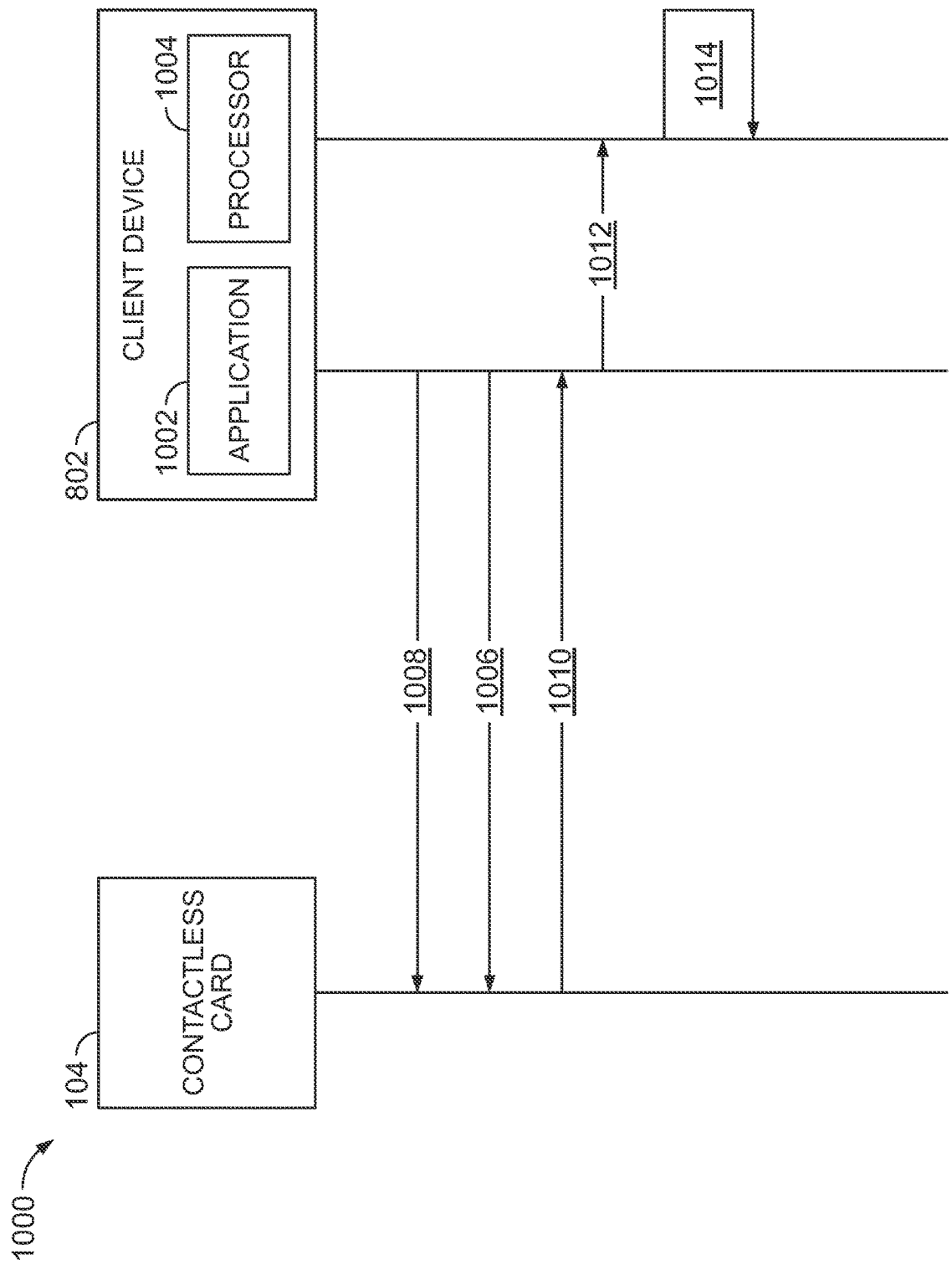
FIG. 10 illustrates a sequence flow 1000 in accordance with one embodiment.

FIG. 10 is a timing diagram illustrating an example sequence for providing authenticated access according to one or more embodiments of the present disclosure. Sequence flow 1000 may include contactless card 104 and client device 802, which may include an application 1002 and processor 1004.

At line 1008, the application 1002 communicates with the contactless card 104 (e.g., after being brought near the contactless card 104). Communication between the application 1002 and the contactless card 104 may involve the contactless card 104 being sufficiently close to a card reader (not shown) of the client device 802 to enable NFC data transfer between the application 1002 and the contactless card 104.

At line 1006, after communication has been established between client device 802 and contactless card 104, contactless card 104 generates a message authentication code (MAC) cryptogram. In some examples, this may occur when the contactless card 104 is read by the application 1002. In particular, this may occur upon a read, such as an NFC read, of a near field data exchange (NDEF) tag, which may be created in accordance with the NFC Data Exchange Format. For example, a reader application, such as application 1002, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 104 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. As previously discussed, the random data may be generated by one or more sensors of the contactless card 104 performing measurements to generate seed values. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string). In some examples, application 1002 may be configured to transmit a request to contactless card 104, the request comprising an instruction to generate a MAC cryptogram.

At line 1010, the contactless card 104 sends the MAC cryptogram to the application 1002. In some examples, the transmission of the MAC cryptogram occurs via NFC, however, the present disclosure is not limited thereto. In other examples, this communication may occur via Bluetooth, Wi-Fi, or other means of wireless data communication. At line 1012, the application 1002 communicates the MAC cryptogram to the processor 1004.

At line 1014, the processor 1004 verifies the MAC cryptogram pursuant to an instruction from the application 122. For example, the MAC cryptogram may be verified, as explained below. In some examples, verifying the MAC cryptogram may be performed by a device other than client device 802, such as a server of a banking system in data communication with the client device 802. For example, processor 1004 may output the MAC cryptogram for transmission to the server of the banking system, which may verify the MAC cryptogram. In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

Figure 11:
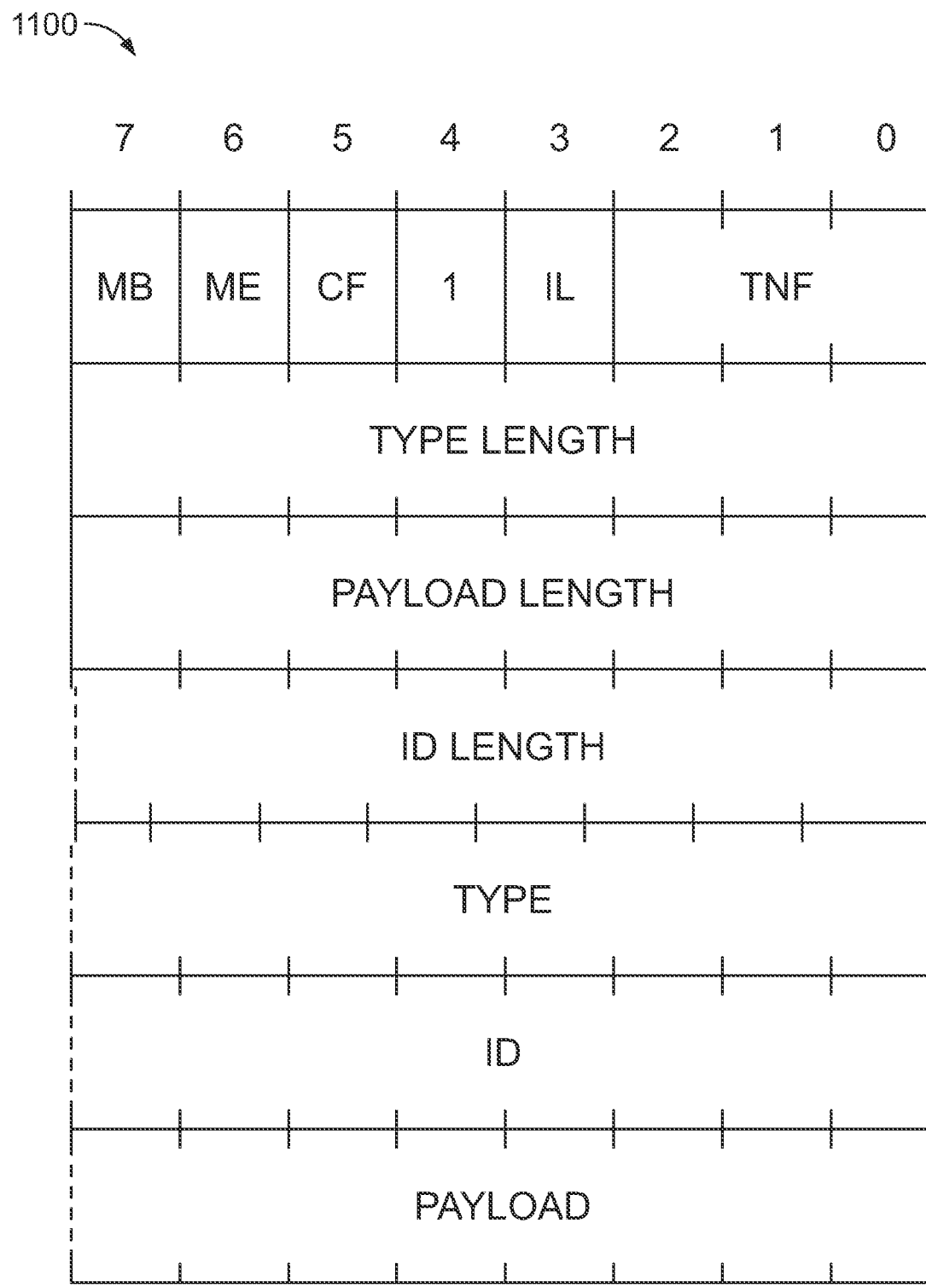
FIG. 11 illustrates a data structure 1100 in accordance with one embodiment.

FIG. 11 illustrates an NDEF short-record layout (SR=1) data structure 1100 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data.

Figure 12:
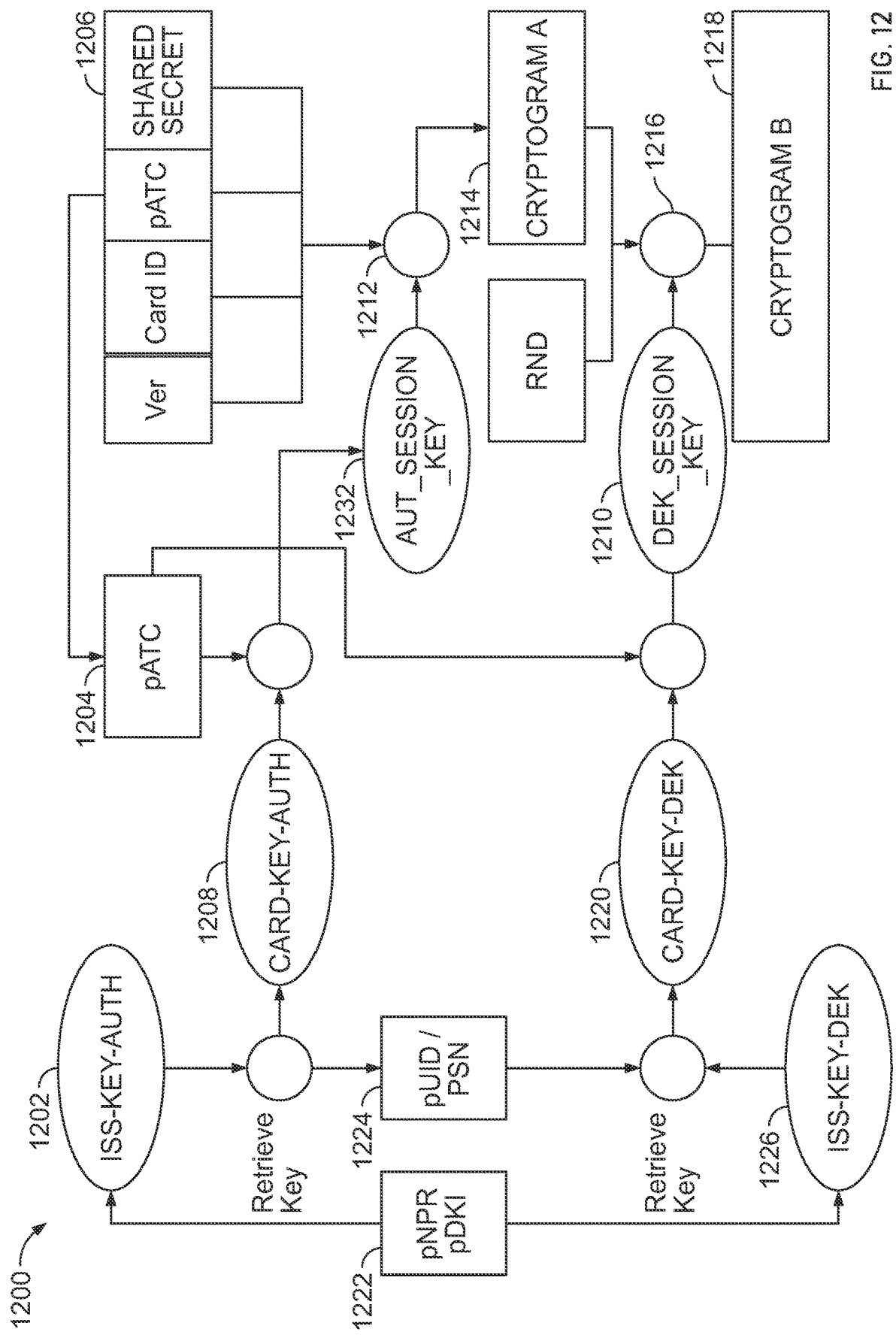
FIG. 12 is a diagram of a key system according to an example embodiment.

FIG. 12 illustrates a diagram of a system 1200 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. Triple DES (3DES) algorithm may be used by EMV and it is implemented by hardware in the contactless card. By using a key diversification process, one or more keys may be derived from a master key based upon uniquely identifiable information for each entity that requires a key.

Regarding master key management, two issuer master keys 1202, 1226 may be required for each part of the portfolio on which the one or more applets is issued. For example, the first master key 1202 may comprise an Issuer Cryptogram Generation/Authentication Key (Iss-Key-Auth) and the second master key 1226 may comprise an Issuer Data Encryption Key (Iss-Key-DEK). As further explained herein, two issuer master keys 1202, 1226 are diversified into card master keys 1208, 1220, which are unique for each card. In some examples, a network profile record ID (pNPR) 522 and derivation key index (pDKI) 1224, as back office data, may be used to identify which Issuer Master Keys 1202, 1226 to use in the cryptographic processes for authentication. The system performing the authentication may be configured to retrieve values of pNPR 1222 and pDKI 1224 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 1208 and Card-Key-Dek 1220). The session keys (Aut-Session-Key 1232 and DEK-Session-Key 1210) may be generated by the one or more applets and derived by using the application transaction counter (pATC) 1204 with one or more algorithms. To fit data into the one or more algorithms, only the 2 low order bytes of the 4-byte pATC 1204 is used. In some examples, the four byte session key derivation method may comprise: F1:=PATC(lower 2 bytes)||'F0'||'00'||PATC (four bytes) F1:=PATC(lower 2 bytes)||'0F'||'00'||PATC (four bytes) SK:={(ALG (MK) [F1])||ALG (MK) [F2]}, where ALG may include 3DES ECB and MK may include the card unique derived master key.

As described herein, one or more MAC session keys may be derived using the lower two bytes of pATC 1204 counter. At each tap of the contactless card, pATC 1204 is configured to be updated, and the card master keys Card-Key-AUTH 1008 and Card-Key-DEK 1220 are further diversified into the session keys Aut-Session-Key 1232 and DEK-Session-KEY 1210. pATC 1204 may be initialized to zero at personalization or applet initialization time. In some examples, the pATC counter 1204 may be initialized at or before personalization, and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that block size may be used, or the output may be automatically, or manually, padded to a multiple of that block size. As discussed herein, the random number may be generated by the contactless card 104 from data generated by one or more sensors as seed values.

The MAC may be performed by a function key (AUT-Session-Key) 1232. The data specified in cryptogram may be processed with javacard.signature method: ALG_DES_MAC8_ISO9797_1_M2_ALG3 to correlate to EMV ARQC verification methods. The key used for this computation may comprise a session key AUT-Session-Key 1232, as explained above. As explained above, the low order two bytes of the counter may be used to diversify for the one or more MAC session keys. As explained below, AUT-Session-Key 1232 may be used to MAC data 1206, and the resulting data or cryptogram A 1214 and random number RND may be encrypted using DEK-Session-Key 1210 to create cryptogram B or output 1218 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 1210 derived from the Card-Key-DEK 1220. In this case, the ATC value for the session key derivation is the least significant byte of the counter pATC 1204.

The format below represents a binary version example embodiment. Further, in some examples, the first byte may be set to ASCII'A'.

| Message Format | | | | |
|---|---|---|---|---|
| 1 | 2 | 4 | 8 | 8 |
| 0x43 (Message Type 'A') | Version | pATC | RND | Cryptogram A (MAC) |
| Cryptogram A (MAC) | 8 bytes | | | |
| MAC of 2 Version | 8 pUID | 4 pATC | 4 Shared Secret | 18 bytes input data |

| Message Format | | | | |
|---|---|---|---|---|
| 1 | 2 | 4 | 16 | |
| 0x43 (Message Type 'A') | Version | pATC | Cryptogram B | |
| Cryptogram A (MAC) | 8 bytes | | | |
| MAC of | | | | |
| 2 | 8 | 4 | 4 | 18 bytes input data |
| Version | pUID | pATC | Shared Secret | |
| Cryptogram B | 16 | | | |
| Sym Encryption of | | | | |
| 8 | 8 | | | |
| RND | Cryptogram A | | | |

Another exemplary format is shown below. In this example, the tag may be encoded in hexadecimal format.

| Message Format | | | | |
|---|---|---|---|---|
| 2 | 8 | 4 | 8 | 8 |
| Version | pUID | pATC | RND | Cryptogram A (MAC) |
| 8 bytes | | | | |
| 8 | 8 | 4 | 4 | 18 bytes input data |
| pUID | pUID | pATC | Shared Secret | |

| Message Format | | | |
|---|---|---|---|
| 2 | 8 | 4 | 16 |
| Version | pUID | pATC | Cryptogram B |
| 8 bytes | | | |
| 8 | 8 | 4 | 4 | 18 bytes input data |
| pUID | pUID | pATC | Shared Secret | |
| Cryptogram B | 16 | | |
| Sym Encryption of | | | |
| 8 | 8 | | |
| RND | Cryptogram A | | |

The UID field of the received message may be extracted to derive, from master keys Iss-Key-AUTH 1002 and Iss-Key-DEK 1226, the card master keys (Card-Key-Auth 1208 and Card-Key-DEK 1220) for that particular card. Using the card master keys (Card-Key-Auth 1008 and Card-Key-DEK 1220), the counter (pATC) field of the received message may be used to derive the session keys (Aut-Session-Key 1232 and DEK-Session-Key 1210) for that particular card. Cryptogram B 1218 may be decrypted using the DEK-Session-KEY, which yields cryptogram A 1214 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram A 1214, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key 1232. The input data 1206 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. As described herein, the random number generators may include processing circuitry processing data from one or more sensors of a contactless card 104. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 1212, data 1206 is processed through the MAC using Aut-Session-Key 1232 to produce MAC output (cryptogram A) 1214, which is encrypted.

In order to provide additional protection against brute force attacks exposing the keys on the card, it is desirable that the MAC cryptogram 1214 be enciphered. In some examples, data or cryptogram A 1214 to be included in the ciphertext may comprise: Random number (8), cryptogram (8). In some examples, the numbers in the brackets may comprise length in bytes. In some examples, the random number may be generated by one or more random number generators, e.g., one or more sensors, which may be configured to ensure, through one or more secure processes, that the random number is unpredictable. The key used to encipher this data may comprise a session key. For example, the session key may comprise DEK-Session-Key 1210. In the encryption operation 1216, data or cryptogram A 1214 and RND are processed using DEK-Session-Key 1010 to produce encrypted data, cryptogram B 1218. The data 1214 may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

Figure 13:
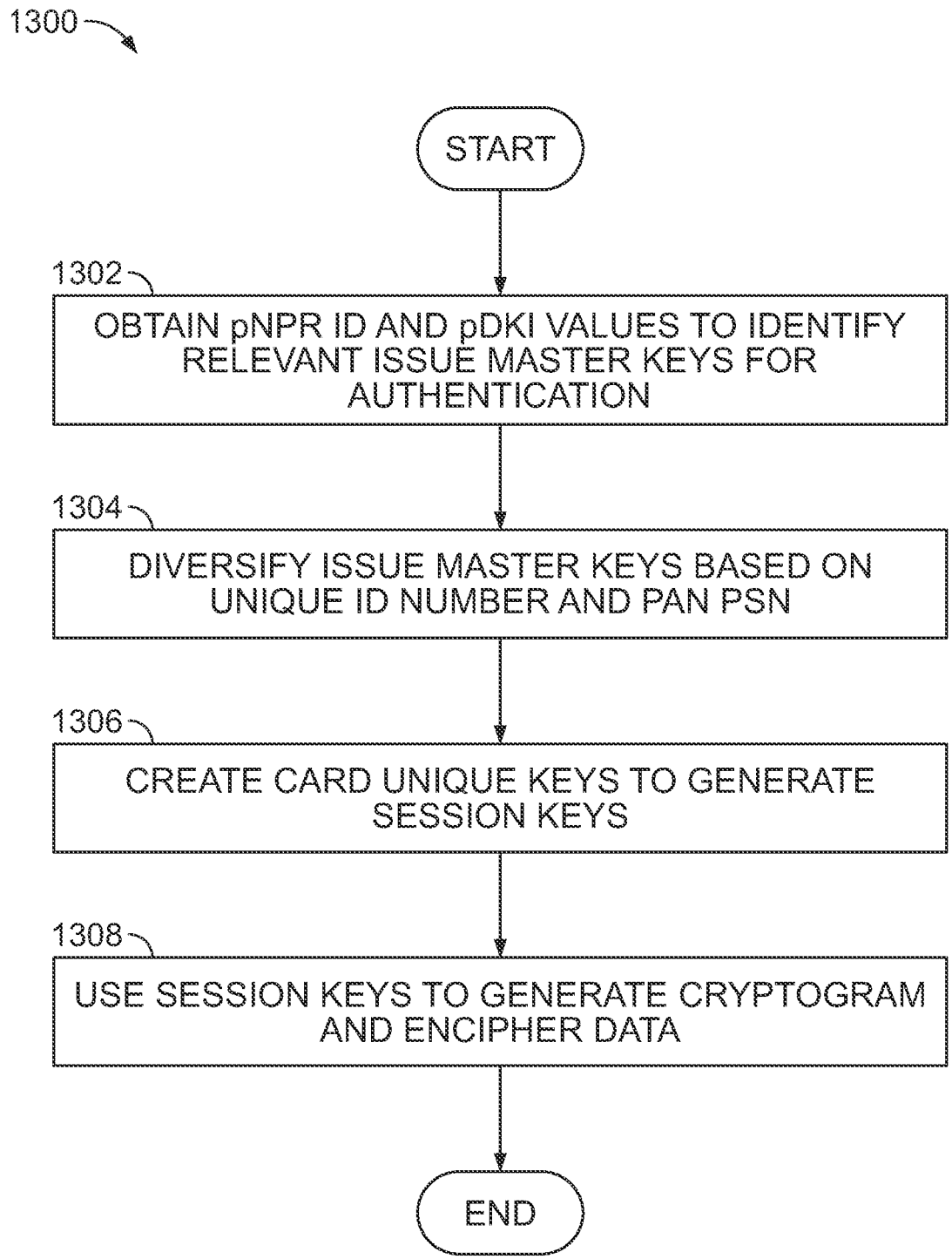
FIG. 13 is a flowchart of a method of generating a cryptogram according to an example embodiment.

FIG. 13 illustrates a method 1300 for generating a cryptogram. For example, at block 1302, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card at the time of authentication.

At block 1304, Issuer Master Keys may be diversified by combining them with the card's unique ID number (pUID) and the PAN sequence number (PSN) of one or more applets, for example, a payment applet.

At block 1306, Card-Key-Auth and Card-Key-DEK (unique card keys) may be created by diversifying the Issuer Master Keys to generate session keys which may be used to generate a MAC cryptogram.

At block 1308, the keys used to generate the cryptogram and encipher the data in the one or more applets may comprise the session keys of block 1230 based on the card unique keys (Card-Key-Auth and Card-Key-DEK). In some examples, these session keys may be generated by the one or more applets and derived by using pATC, resulting in session keys Aut-Session-Key and DEK-Session-Key.

Figure 14:
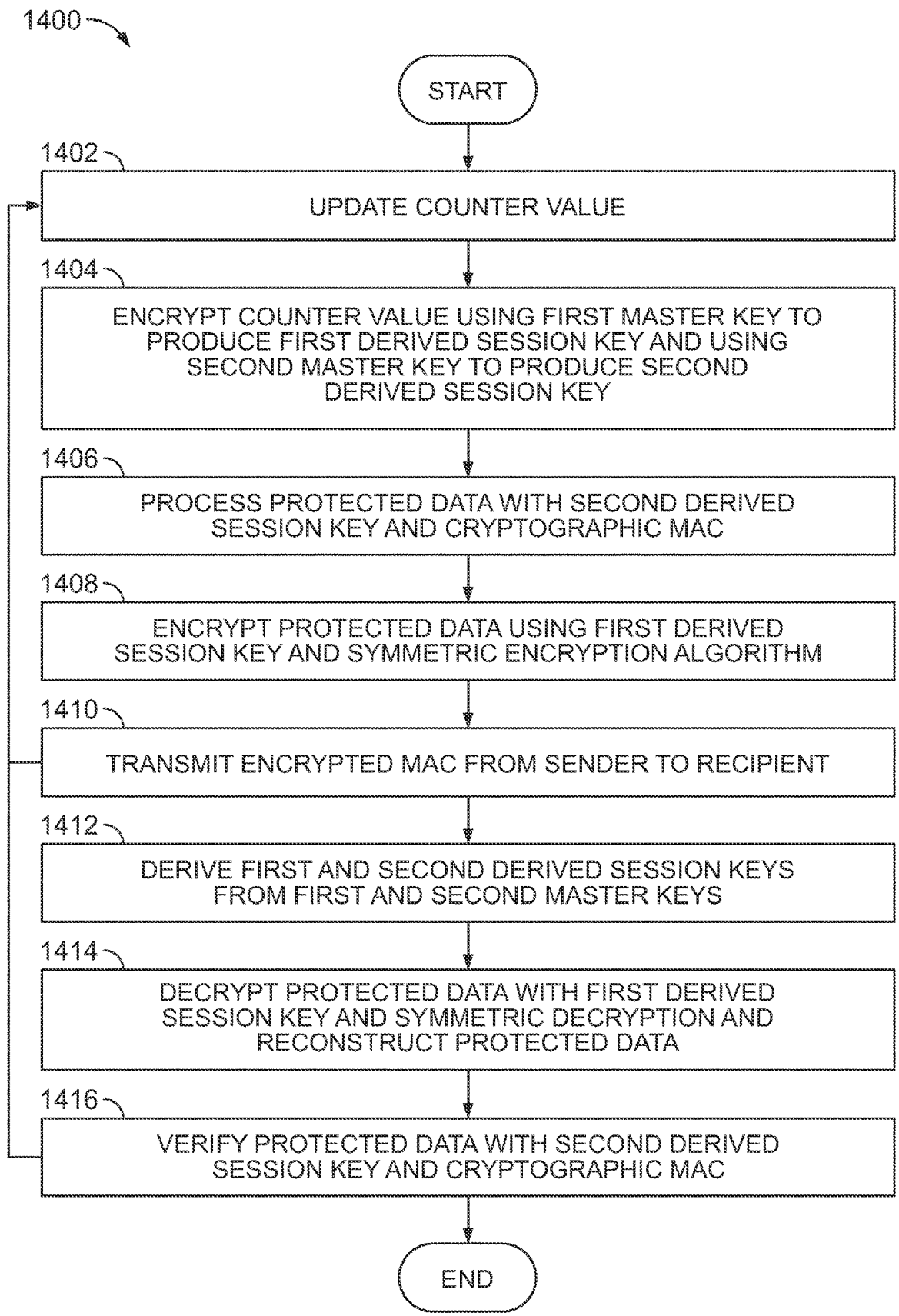
FIG. 14 illustrates an aspect of the subject matter in accordance with one embodiment.

FIG. 14 depicts an exemplary process 1400 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at block 1402, and other data, such as data to be protected, which it may secure share with the recipient.

At block 1404, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At block 1406, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At block 1408, the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At block 1410, the encrypted MAC is transmitted, from the sender to the recipient, with sufficient information to identify additional secret information (such as shared secret, master keys, etc.), for verification of the cryptogram.

At block 1412, the recipient uses the received counter value to independently derive the two derived session keys from the two master keys as explained above.

At block 1414, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At block 1416, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 1402) and a new set of session keys may be created (at block 1410). In some examples, the combined random data may be discarded.

Figure 15:
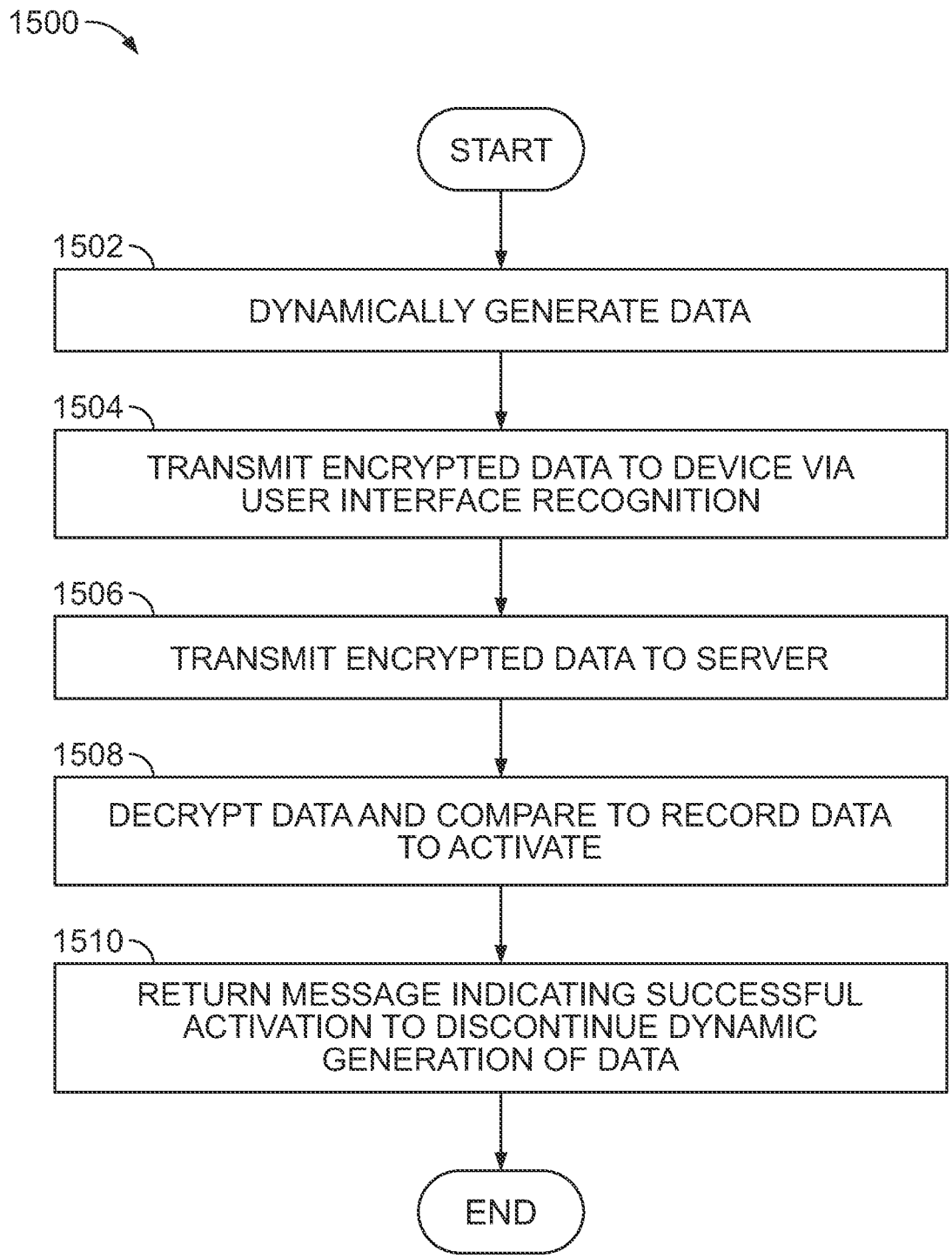
FIG. 15 illustrates an aspect of the subject matter in accordance with one embodiment.

FIG. 15 illustrates a method 1300 for card activation according to an example embodiment. For example, card activation may be completed by a system including a card, a device, and one or more servers. The contactless card, device, and one or more servers may reference same or similar components that were previously explained a, such as contactless card 104, client device 802, and a server.

In block, the card may be configured to dynamically generate data. In some examples, this data may include information such as an account number, card identifier, card verification value, or phone number, which may be transmitted from the card to the device. In some examples, one or more portions of the data may be encrypted via the systems and methods disclosed herein.

In block 1504, one or more portions of the dynamically generated data may be communicated to an application of the device via NFC or other wireless communication. For example, a tap of the card proximate to the device may allow the application of the device to read the one or more portions of the data associated with the contactless card. In some examples, if the device does not comprise an application to assist in activation of the card, the tap of the card may direct the device or prompt the customer to a software application store to download an associated application to activate the card. In some examples, the user may be prompted to sufficiently gesture, place, or orient the card towards a surface of the device, such as either at an angle or flatly placed on, near, or proximate the surface of the device. Responsive to a sufficient gesture, placement and/or orientation of the card, the device may proceed to transmit the one or more encrypted portions of data received from the card to the one or more servers.

In block 1506, the one or more portions of the data may be communicated to one or more servers, such as a card issuer server. For example, one or more encrypted portions of the data may be transmitted from the device to the card issuer server for activation of the card.

In block 1508, the one or more servers may decrypt the one or more encrypted portions of the data via the systems and methods disclosed herein. For example, the one or more servers may receive the encrypted data from the device and may decrypt it in order to compare the received data to record data accessible to the one or more servers. If a resulting comparison of the one or more decrypted portions of the data by the one or more servers yields a successful match, the card may be activated. If the resulting comparison of the one or more decrypted portions of the data by the one or more servers yields an unsuccessful match, one or more processes may take place. For example, responsive to the determination of the unsuccessful match, the user may be prompted to tap, swipe, or wave gesture the card again. In this case, there may be a predetermined threshold comprising a number of attempts that the user is permitted to activate the card. Alternatively, the user may receive a notification, such as a message on his or her device indicative of the unsuccessful attempt of card verification and to call, email or text an associated service for assistance to activate the card, or another notification, such as a phone call on his or her device indicative of the unsuccessful attempt of card verification and to call, email or text an associated service for assistance to activate the card, or another notification, such as an email indicative of the unsuccessful attempt of card verification and to call, email or text an associated service for assistance to activate the card.

In block 1510, the one or more servers may transmit a return message based on the successful activation of the card. For example, the device may be configured to receive output from the one or more servers indicative of a successful activation of the card by the one or more servers. The device may be configured to display a message indicating successful activation of the card. Once the card has been activated, the card may be configured to discontinue dynamically generating data so as to avoid fraudulent use. In this manner, the card may not be activated thereafter, and the one or more servers are notified that the card has already been activated.

Figure 16:
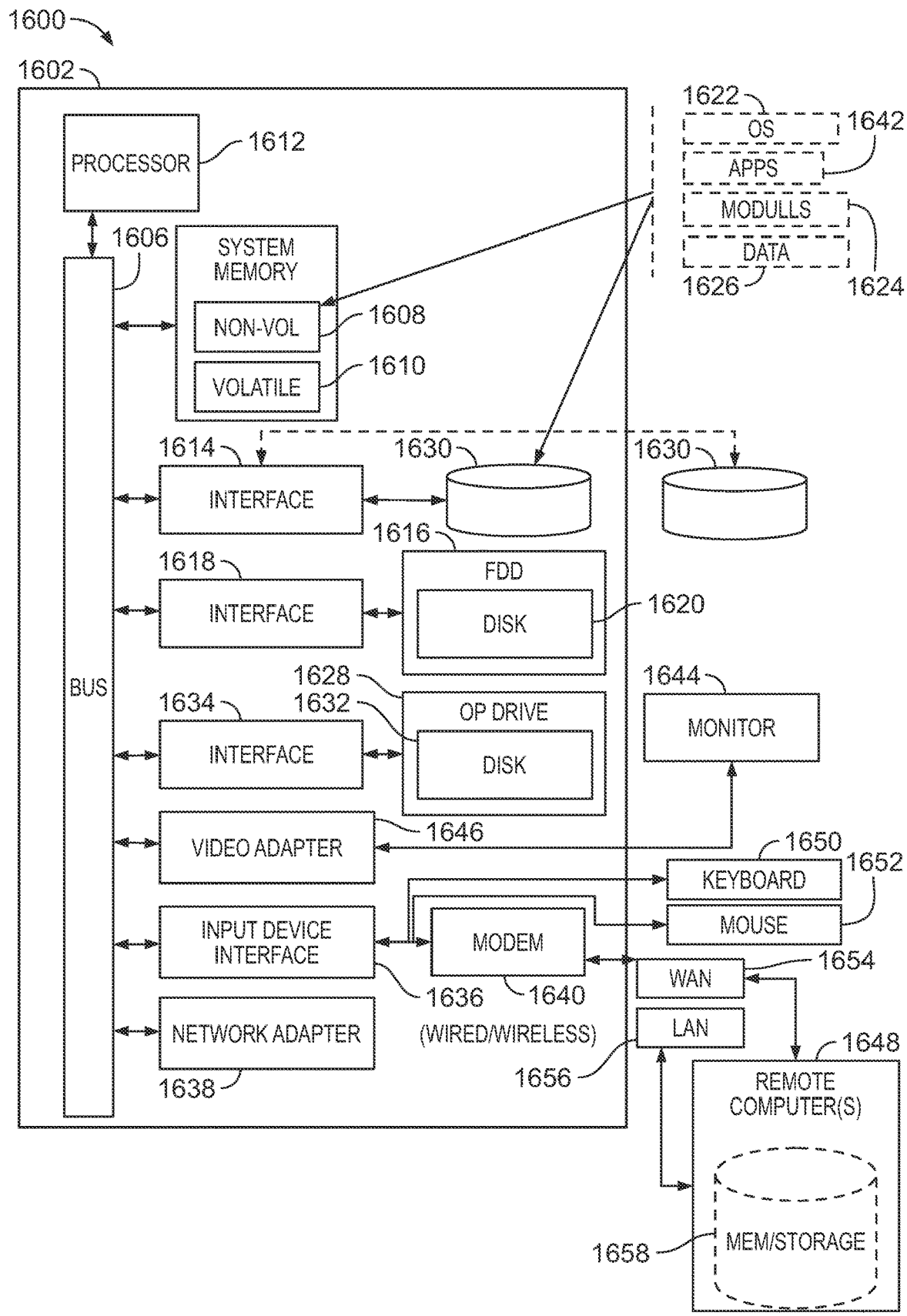
FIG. 16 illustrates a computer architecture 1600 in accordance with one embodiment.

FIG. 16 illustrates an embodiment of an exemplary computer architecture 1600 suitable for implementing various embodiments as previously described. In one embodiment, the computer architecture 1600 may include or be implemented as part of one or more systems or devices discussed herein.

As used in this application, the terms "system" and "component" are intended to refer to a computer-related entity, either hardware, a combination of hardware and software, software, or software in execution, examples of which are provided by the exemplary computing computer architecture 1600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 100.

As shown in FIG. 16, the computing architecture 100 includes a processor 1612, a system memory 1604 and a system bus 1606. The processor 1612 can be any of various commercially available processors.

The system bus 1606 provides an interface for system components including, but not limited to, the system memory 1604 to the processor 1612. The system bus 1606 can be any of several types of bus structure that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 100 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1604 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 16, the system memory 1604 can include non-volatile 1608 and/or volatile 1610. A basic input/output system (BIOS) can be stored in the non-volatile 1608.

The computer 1602 may include various types of computer-readable storage media in the form of one or more lower speed memory units, including an internal (or external) hard disk drive 1630, a magnetic disk drive 1616 to read from or write to a removable magnetic disk 1620, and an optical disk drive 1628 to read from or write to a removable optical disk 1632 (e.g., a CD-ROM or DVD). The hard disk drive 1630, magnetic disk drive 1616 and optical disk drive 1628 can be connected to system bus 1606 the by an HDD interface 1614, and FDD interface 1618 and an optical disk drive interface 1634, respectively. The HDD interface 1614 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 1608, and volatile 1610, including an operating system 1622, one or more applications 1642, other program modules 1624, and program data 1626. In one embodiment, the one or more applications 1642, other program modules 1624, and program data 1626 can include, for example, the various applications and/or components of the systems discussed herein.

A user can enter commands and information into the computer 1602 through one or more wire/wireless input devices, for example, a keyboard 1650 and a pointing device, such as a mouse 1652. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 1612 through an input device interface 1636 that is coupled to the system bus 1606 but can be connected by other interfaces such as a parallel port, IEEE 1394 serial port, a game port, a USB port, an IR interface, and so forth.

A monitor 1644 or other type of display device is also connected to the system bus 1606 via an interface, such as a video adapter 1646. The monitor 1644 may be internal or external to the computer 1602. In addition to the monitor 1644, a computer typically includes other peripheral output devices, such as speakers, printers, and so forth.

The computer 1602 may operate in a networked environment using logical connections via wire and/or wireless communications to one or more remote computers, such as a remote computer(s) 1648. The remote computer(s) 1648 can be a workstation, a server computer, a router, a personal computer, portable computer, microprocessor-based entertainment appliance, a peer device or other common network node, and typically includes many or all the elements described relative to the computer 1602, although, for purposes of brevity, only a memory and/or storage device 1658 is illustrated. The logical connections depicted include wire/wireless connectivity to a local area network 1656 and/or larger networks, for example, a wide area network 1654. Such LAN and WAN networking environments are commonplace in offices and companies, and facilitate enterprise-wide computer networks, such as intranets, all of which may connect to a global communications network, for example, the Internet.

When used in a local area network 1656 networking environment, the computer 1602 is connected to the local area network 1656 through a wire and/or wireless communication network interface or network adapter 1638. The network adapter 1638 can facilitate wire and/or wireless communications to the local area network 1656, which may also include a wireless access point disposed thereon for communicating with the wireless functionality of the network adapter 1638.

When used in a wide area network 1654 networking environment, the computer 1602 can include a modem 1640, or is connected to a communications server on the wide area network 1654 or has other means for establishing communications over the wide area network 1654, such as by way of the Internet. The modem 1640, which can be internal or external and a wire and/or wireless device, connects to the system bus 1606 via the input device interface 1636. In a networked environment, program modules depicted relative to the computer 1602, or portions thereof, can be stored in the remote memory and/or storage device 1658. It will be appreciated that the network connections shown are exemplary and other means of establishing a communications link between the computers can be used.

The computer 1602 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described herein may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Figure 17:
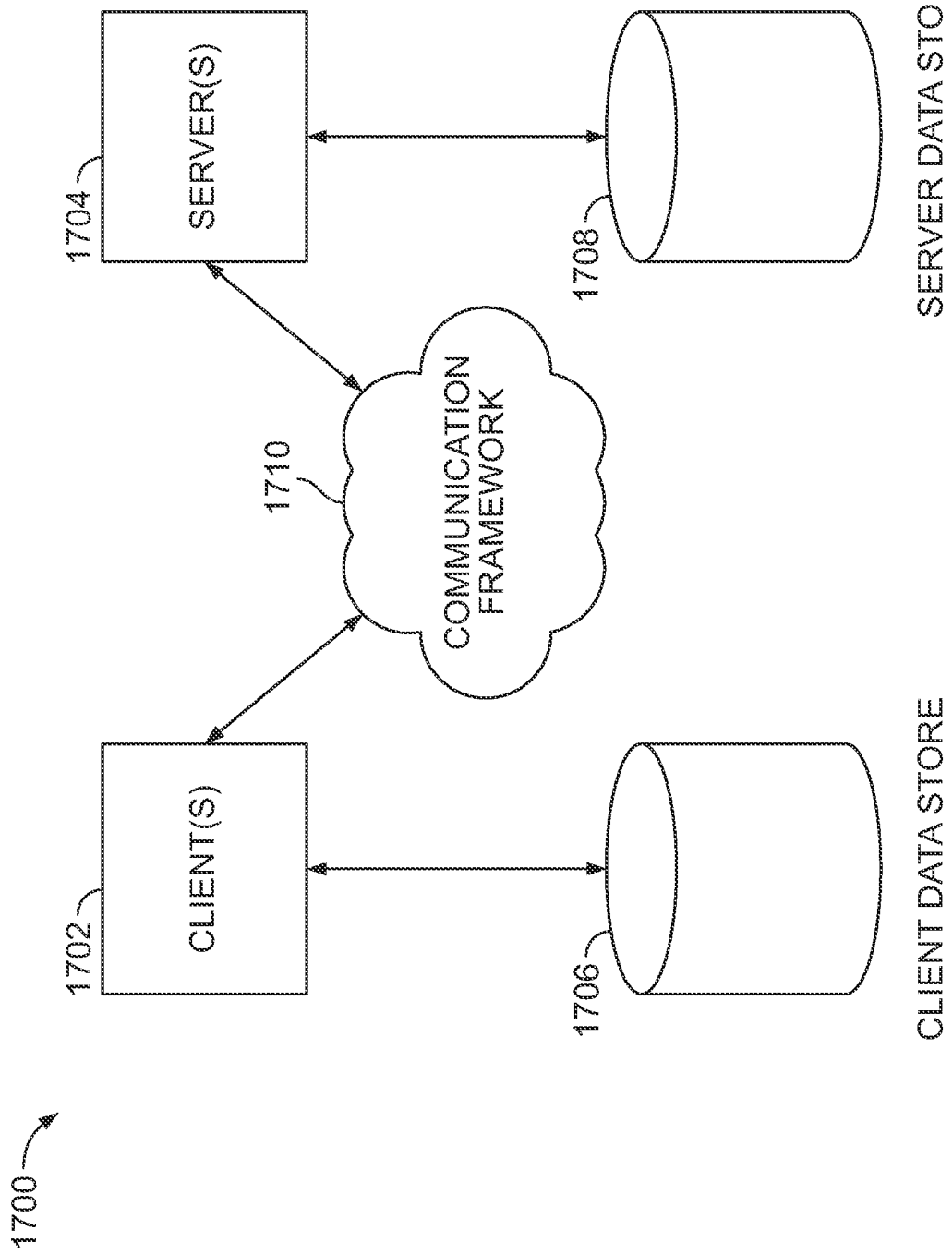
FIG. 17 illustrates a communications architecture 1700 in accordance with one embodiment.

FIG. 17 is a block diagram depicting an exemplary communications architecture 1700 suitable for implementing various embodiments as previously described. The communications architecture 1700 includes various common communications elements, such as a transmitter, receiver, transceiver, radio, network interface, baseband processor, antenna, amplifiers, filters, power supplies, and so forth. The embodiments, however, are not limited to implementation by the communications architecture 1700, which may be consistent with systems and devices discussed herein.

As shown in FIG. 17, the communications architecture 1700 includes one or more client(s) 1702 and server(s) 1704. The server(s) 1704 may implement one or more functions and embodiments discussed herein. The client(s) 1702 and the server(s) 1704 are operatively connected to one or more respective client data store 1706 and server data store 1708 that can be employed to store information local to the respective client(s) 1702 and server(s) 1704, such as cookies and/or associated contextual information.

The client(s) 1702 and the server(s) 1704 may communicate information between each other using a communication framework 1710. The communication framework 1710 may implement any well-known communications techniques and protocols. The communication framework 1710 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1710 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by client(s) 1702 and the server(s) 1704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

What is claimed is:

1. A contactless card, comprising:
   one or more sensors;
   processing circuitry coupled with the one or more sensors;
   memory coupled with the processing circuitry and the one or more sensors, the memory to store instructions, that when executed by the processing circuitry, to cause the processing circuitry to:
   receive data from at least one of the one or more sensors;
   generate a random sample of the data by randomly sampling a portion of the data;
   generate a random number with the random sample and a cryptographic algorithm; and
   generate a pair of keys with a key generation algorithm using the random number, the pair of keys comprising a private key and a public key.

2. The contactless card of claim 1, the processing circuitry to configured to communicate the public key of the pair of keys to a device via a wireless interface.

3. The contactless card of claim 2, wherein the wireless interface is a near-field communication (NFC) interface, and the processing circuitry to communicate the public key to the device in response to an NFC read for the public key.

4. The contactless card of claim 1, wherein the one or more sensors comprise an accelerometer, a thermometer, a magnetometer, a gyroscope, and a pressure sensor.

5. The contactless card of claim 1, the processing circuitry configured to apply a mathematical operation to combine readings from multiple of the one or more sensors to generate the data.

6. The contactless card of claim 5, the processing circuitry to apply a normalization operation to the data for readings from the multiple of the one or more sensors.

7. The contactless card of claim 1, the processing circuitry to sign authentication information with the private key to authenticate the contactless card, a user of the contactless card, or both to another device having the public key.

8. The contactless card of claim 1, the processing circuitry to apply a hash operation to the random number prior to generation of the pair of keys with the key generation algorithm.

9. A computer-implemented method, comprising:
collecting, by processing circuitry of a contactless card, data from a plurality of sensors of the contactless card;
randomly sampling, by the processing circuitry, the data from the plurality of sensors to generate a seed value;
utilizing, by the processing circuitry, the seed value with a cryptographic algorithm to generate a random number;
generating, by the processing circuitry, a pair of keys with a key generation algorithm using the seed value, the pair of keys comprising a private key and a public key; and
storing, by the processing circuitry, the pair of keys in memory of the contactless card.

10. The computer-implemented method of claim 9, comprising sending, by the processing circuitry via a wireless interface of the contactless card, the public key to a computing device.

11. The computer-implemented method of claim 10, wherein the wireless interface is a near-field communication (NFC) interface, and the method includes sending the public key to the device in response to an NFC read for the public key.

12. The computer-implemented method of claim 10, comprising combining the data from the plurality of sensors by applying a mathematical operation to the data.

13. The computer-implemented method of claim 12, comprising normalizing the data prior to combining the data.

14. The computer-implemented method of claim 10, comprising encrypting authentication information with the private key for use to authenticate the contactless card, a user of the contactless card, or both to another device having the public key.

15. The computer-implemented method of claim 10, comprising applying a hash operation to the random number sample prior to generation of the pair of keys with the cryptographic algorithm.

16. A contactless card, comprising:
one or more sensors;
processing circuitry coupled with the one or more sensors;
memory coupled with the processing circuitry and the one or more sensors, the memory to store instructions, that when executed by the processing circuitry, to cause the processing circuitry to:
receive data from at least one of the one or more sensors;
generate a random sample of the data by randomly sampling a portion of the data;
receive a request for a random number from a device;
apply a cryptographic algorithm to the random sample to generate the random number; and
send, in response to the request, the random number to the device.

17. The contactless card of claim 16, comprising a near-field communication (NFC) interface, and the processing circuitry to receive the request and send the random number via the NFC interface.

18. The contactless card of claim 16, wherein the one or more sensors comprise an accelerometer, a thermometer, a magnetometer, a gyroscope, and a pressure sensor.

19. The contactless card of claim 16, the processing circuitry configured to apply a mathematical operation to combine readings from multiple of the one or more sensors prior to generation of the random number.

20. The contactless card of claim 19, the processing circuitry to apply a normalization operation to the data for readings from the multiple of the one or more sensors.

* * * * *